United States Patent
Partovi

(10) Patent No.: US 12,515,541 B2
(45) Date of Patent: Jan. 6, 2026

(54) WIRELESS POWER TRANSFER

(71) Applicant: Mojo Mobility Inc., Palo Alto, CA (US)

(72) Inventor: Afshin Partovi, Palo Alto, CA (US)

(73) Assignee: Mojo Mobility Inc., Sunnyvale, CA (US)

( * ) Notice: Subject to any disclaimer, the term of this patent is extended or adjusted under 35 U.S.C. 154(b) by 0 days.

(21) Appl. No.: 18/584,391

(22) Filed: Feb. 22, 2024

(65) Prior Publication Data

US 2024/0270091 A1    Aug. 15, 2024

Related U.S. Application Data

(63) Continuation of application No. 17/230,830, filed on Apr. 14, 2021, now Pat. No. 11,912,143, which is a
(Continued)

(51) Int. Cl.
*H02J 7/00* (2006.01)
*B60L 53/12* (2019.01)
(Continued)

(52) U.S. Cl.
CPC .......... *B60L 53/12* (2019.02); *H01F 27/2823* (2013.01); *H01F 27/288* (2013.01);
(Continued)

(58) Field of Classification Search
None
See application file for complete search history.

(56) References Cited

U.S. PATENT DOCUMENTS 4,549,042 A    10/1985 Akiba
4,754,180 A *  6/1988 Kiedrowski ............ H01F 38/14
                                                  336/83
(Continued)

FOREIGN PATENT DOCUMENTS

WO    2005109597 A1    11/2005
WO    2011156768 A2    12/2011
WO    2012095850 A1     7/2012

OTHER PUBLICATIONS

Lee et al.: "Spiral Inductor Design for Quality Factor", Journal of Semiconductor Technology and Science, vol. 2, No. 1, Mar. 2002, 3 pages.
(Continued)

*Primary Examiner* — Arun C Williams
(74) *Attorney, Agent, or Firm* — NK Patent Law

(57) ABSTRACT

The invention enables efficient wireless power transfer, and charging of devices and batteries, in a manner that allows freedom of placement of devices or batteries in one or multiple dimensions. Provided is a base unit for wireless power transfer or charging through a time varying magnetic field. The unit typically includes a magnetic material or layer that guides magnetic flux generated by a charger coil as to create a preferential path for returning magnetic flux from a receiver coil in one or multiple dimensions. The receiver may include a magnetic core having a magnetic permeability exceeding 1 with copper Litz wire around a ferrite core. With power receivers proximate to the base unit, the base unit coil may inductively generate a current in receiver coils or receivers associated with the power receivers. Uni-directionally or bi-directionally wireless communication protocols include NFC, Bluetooth, WiFi, and etc. control and optimize power transfer therebetween.

20 Claims, 23 Drawing Sheets

Related U.S. Application Data continuation of application No. 16/165,771, filed on Oct. 19, 2018, now Pat. No. 11,005,285, which is a continuation-in-part of application No. 13/829,346, filed on Mar. 14, 2013, now Pat. No. 10,115,520, which is a continuation-in-part of application No. 13/352,096, filed on Jan. 17, 2012, now Pat. No. 9,178,369.

(51) Int. Cl.

| | | |
|---|---|---|
| *H01F 27/28* | (2006.01) | |
| *H01F 27/36* | (2006.01) | |
| *H01F 38/14* | (2006.01) | |
| *H02J 50/12* | (2016.01) | |
| *H02J 50/70* | (2016.01) | |
| *H02J 50/90* | (2016.01) | |
| *H04B 5/26* | (2024.01) | |
| *H04B 5/72* | (2024.01) | |
| *H04B 5/79* | (2024.01) | |
| *H04W 4/80* | (2018.01) | |
| *H02J 50/23* | (2016.01) | |

(52) U.S. Cl.
CPC .......... *H01F 27/36* (2013.01); *H01F 27/361* (2020.08); *H01F 27/363* (2020.08); *H01F 27/366* (2020.08); *H01F 38/14* (2013.01); *H02J 7/0013* (2013.01); *H02J 7/0044* (2013.01); *H02J 50/12* (2016.02); *H02J 50/70* (2016.02); *H02J 50/90* (2016.02); *H04B 5/263* (2024.01); *H04B 5/72* (2024.01); *H04B 5/79* (2024.01); *H04W 4/80* (2018.02); *H02J 50/23* (2016.02)

(56) References Cited

U.S. PATENT DOCUMENTS

| | | | |
|---|---|---|---|
| 5,917,307 A * | 6/1999 | Watanabe | H01F 38/14 320/108 |
| 6,057,668 A | 5/2000 | Chao | |
| 7,109,682 B2 | 9/2006 | Takagi et al. | |
| 7,211,986 B1 | 5/2007 | Flowerdew et al. | |
| 7,612,528 B2 | 11/2009 | Baarman et al. | |
| 7,791,311 B2 | 9/2010 | Sagoo | |
| 8,243,049 B2 | 8/2012 | Vos | |
| 8,390,249 B2 | 3/2013 | Walley et al. | |
| 8,587,154 B2 | 11/2013 | Fells et al. | |
| 8,855,554 B2 | 10/2014 | Cook et al. | |
| 8,912,686 B2 | 12/2014 | Stoner, Jr. et al. | |
| 8,975,523 B2 | 3/2015 | Silva | |
| 9,178,376 B2 | 11/2015 | Jung et al. | |
| 9,531,501 B2 | 12/2016 | Linde et al. | |
| 11,114,886 B2 | 9/2021 | Partovi | |
| 2004/0000974 A1 | 1/2004 | Odenaal et al. | |
| 2005/0068019 A1 | 3/2005 | Nakamura et al. | |
| 2007/0057667 A1 | 3/2007 | Ando et al. | |
| 2007/0182367 A1 | 8/2007 | Partovi | |
| 2009/0071234 A1 | 3/2009 | Blaut et al. | |
| 2010/0045405 A1 | 2/2010 | Shimamura et al. | |
| 2012/0047972 A1 | 3/2012 | Grant et al. | |
| 2012/0235636 A1 | 9/2012 | Partovi | |
| 2014/0224267 A1 | 8/2014 | Levitz et al. | |
| 2014/0339916 A1 | 11/2014 | Fells et al. | |
| 2015/0102684 A1 | 4/2015 | Tanaka et al. | |
| 2015/0145339 A1 | 5/2015 | Chiyo et al. | |
| 2015/0145340 A1 | 5/2015 | Chiyo | |
| 2015/0145341 A1 | 5/2015 | Chiyo et al. | |
| 2018/0269714 A1 | 9/2018 | Samuelsson et al. | |
| 2020/0070673 A1 | 3/2020 | Nishimura et al. | |

OTHER PUBLICATIONS

Pedder et al: "A Contactless Electrical Energy System", IEEE Transactions on Industrial Electronics, vol. 46, No. 1, Feb. 1999.

Qi 1.0.1 Wireless Power Transfer Specification, Oct. 2010, Wireless Power Consortium, Wireless Power Consortium.

USPTO, Non-Final Office Action for corresponding U.S. Appl. No. 17/467,032, dated Dec. 27, 2021, 6 pages.

USPTO, Notice of Allowance for corresponding U.S. Appl. No. 17/230,830, dated Jun. 15, 2023, 5 pages.

USPTO, Notice of Allowance for corresponding U.S. Appl. No. 17/467,032, dated Feb. 2, 2022, 5 pages.

USPTO, Petition for Inter Partes Review of U.S. Pat. No. 11,292,349, *Samsung Electronics Co., Ltd.* (Petitioner) v. *Mojo Mobility Inc.* (Patent Owner), Jun. 27, 2023, 104 pages.

USPTO, Petition for Inter Partes Review of U.S. Pat. No. 11,292,349, *Samsung Electronics Co., Ltd.* (Petitioner) v. *Mojo Mobility Inc.* (Patent Owner), Jun. 27, 2023, 113 pages.

* cited by examiner

370

380

400

(a)

410

(b)

420

(a)

430

(b)

460

464

470

472

WIRELESS POWER TRANSFER

CLAIM OF PRIORITY

This application is a continuation of U.S. patent application Ser. No. 17/230,830, entitled "IMPROVED WIRELESS POWER TRANSFER", filed Apr. 14, 2021, which is a continuation of U.S. patent application Ser. No. 16/165,771, entitled "WIRELESS POWER TRANSFER", filed Oct. 19, 2018, issued as U.S. Pat. No. 11,005,285 on May 11, 2021, which is a continuation-in-part of and claims priority to U.S. patent application Ser. No. 13/829,346, entitled "SYSTEMS AND METHODS FOR WIRELESS POWER TRANSFER", filed Mar. 14, 2013, issued as U.S. Pat. No. 10,115,520 on Oct. 30, 2018, which is a continuation-in-part of U.S. patent application Ser. No. 13/352,096, entitled "SYSTEMS AND METHODS FOR PROVIDING POSITIONING FREEDOM, AND SUPPORT OF DIFFERENT VOLTAGES, PROTOCOLS, AND POWER LEVELS IN A WIRELESS POWER SYSTEM," filed Jan. 17, 2012, issued as U.S. Pat. No. 9,178,369 on Nov. 3, 2015, the disclosures of which are hereby incorporated by reference.

CROSS REFERENCE TO RELATED CASES

This application is also related to U.S. Patent Publication No. 20120235636 (U.S. patent application Ser. No. 13/352,096) titled "SYSTEMS AND METHODS FOR PROVIDING POSITIONING FREEDOM, AND SUPPORT OF DIFFERENT VOLTAGES, PROTOCOLS, AND POWER LEVELS IN A WIRELESS POWER SYSTEM", filed Jan. 17, 2012, which claims the benefit of priority to U.S. Provisional Patent Application No. 61/433,883, titled "SYSTEM AND METHOD FOR MODULATING THE PHASE AND AMPLITUDE OF AN ELECTROMAGNETIC WAVE IN MULTIPLE DIMENSIONS", filed Jan. 18, 2011; U.S. Provisional Patent Application No. 61/478,020, titled "SYSTEM AND METHOD FOR MODULATING THE PHASE AND AMPLITUDE OF AN ELECTROMAGNETIC WAVE IN MULTIPLE DIMENSIONS", filed Apr. 21, 2011; and U.S. Provisional Patent Application No. 61/546,316, titled "SYSTEMS AND METHODS FOR PROVIDING POSITIONING FREEDOM, AND SUPPORT OF DIFFERENT VOLTAGES, PROTOCOLS, AND POWER LEVELS IN A WIRELESS POWER SYSTEM", filed Oct. 12, 2011; each of which above applications are herein incorporated by reference. All references mentioned expressly or implicitly herein are to be treated as being disclosed in an information disclosure statement submitted to the Patent and Trademark Office (USPTO).

COPYRIGHT NOTICE

A portion of the disclosure of this patent document contains material which is subject to copyright protection. The copyright owner has no objection to the facsimile reproduction by anyone of the patent document or the patent disclosure, as it appears in the USPTO patent file or records, but otherwise reserves all copyright rights whatsoever.

TECHNICAL FIELD

Embodiments of the invention are generally related to systems and methods for wireless power transfer, including usage with electric or electronic devices, vehicles, batteries, or other products, or with add-on accessories such as cases, battery doors, or skins that incorporate a receiver for transferring the power to the device, vehicle, battery, or other product.

BACKGROUND

Traditional wireless technologies, for powering or charging mobile or other electronic or electric devices, generally use a wireless power transmitter and wireless power receiver in combination, to provide a means for transfer of power across a distance. In a typical system, the transmitter and receiver coils are aligned and of comparable size. This requires the user to place their device or battery to be charged in a specific location with respect to the charger, which is an undesirable restriction. These are some of the general areas that embodiments of the invention can address.

SUMMARY

Described herein are systems and methods for enabling efficient wireless power transfer, and charging of devices and batteries, in a manner that allows freedom of placement of the devices or batteries in one or multiple (e.g., one, two or three) dimensions. In accordance with various embodiments, applications include inductive or magnetic charging and power, and wireless powering or charging of, e.g., mobile, electronic, electric, lighting, batteries, power tools, kitchen, military, medical or dental, industrial applications, vehicles, trains or other devices or products. In accordance with various embodiments, the systems and methods can also be generally applied, e.g., to power supplies or other power sources or charging systems, such as systems for transfer of wireless power to a mobile, electronic or electric device, vehicle, or other product.

DETAILED DESCRIPTION

Figure 1:
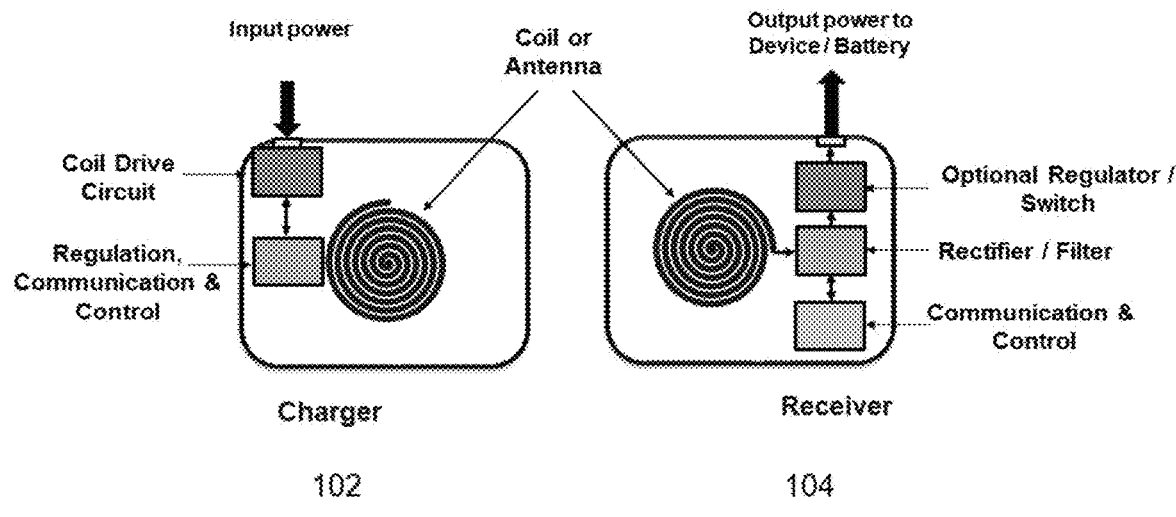
FIG. 1 illustrates a wireless charger or power system, in accordance with an embodiment.

Before describing the invention in detail, it should be noted that the articles "a," "an," and "the," when used herein to refer to an item having a singular form, that the item may be singular or plural in nature. Thus, "a device" may refer to "one or more devices." In addition, as described above, traditional wireless technologies, for powering or charging mobile or other electronic or electric devices, generally use a wireless power transmitter and wireless power receiver in combination, to provide a means for transfer of power across a distance. In a typical system, the transmitter and receiver coils are aligned and of comparable size. This typically requires the user to place their device or battery to be charged in a specific location with respect to the charger, which is an undesirable restriction.

In accordance with an embodiment, described herein are systems and methods for enabling efficient wireless power transfer, and charging of devices and batteries, in a manner that allows freedom of placement of the devices or batteries in one or multiple (e.g., one, two or three) dimensions. In accordance with various embodiments, applications include inductive or magnetic charging and power, and wireless powering or charging of, e.g., mobile, electronic, electric, lighting, batteries, power tools, kitchen, military, medical or dental, industrial applications, vehicles, automobiles, electric bicycles and motorcycles, Segway type of devices, trains or other transport vehicles or devices or products. In accordance with various embodiments, the systems and methods can also be generally applied, e.g., to power supplies or other power sources or charging systems, such as systems for transfer of wireless power to a mobile, electronic or electric device, vehicle, or other product.

In accordance with an embodiment, it is desirable that the receiver can be placed on a larger surface area charger, without the need for specific alignment of the position of the receiver.

In accordance with an embodiment, it is also desirable to be able to charge or power multiple devices having similar or different power and voltage requirements, or operating with different wireless charging protocols on or near the same surface.

In accordance with an embodiment, it is also desirable to provide some degree of freedom with respect to vertical distance (away from the surface of the charger) between the charger and the receivers. An exemplary use of such a large gap is in charging of electric vehicles (EV), or trains. Another example includes situations where the charger may need to be physically separated from the device or battery to be charged, such as when a charger is incorporated beneath a surface such as the center console of a car or under the surface of a table or desk.

With the proliferation of electrical and electronic devices, and vehicles or trains (which are herein considered examples of devices), simple and universal methods of providing power and or charging of these devices is becoming increasingly important.

As used herein, the term device, product, or battery is used to include any electrical, electronic, mobile, lighting, or other product, batteries, power tools, cleaning, industrial, kitchen, lighting, military, medical, dental or specialized products and vehicles or movable machines such as robots or mobile machine whereby the product, part, or component is powered by electricity or an internal or external battery and/or can be powered or charged externally or internally by a generator or solar cell, fuel cell, hand or other mechanical crank or alike.

In accordance with an embodiment, a product or device can also include an attachable or integral skin, case, battery door or attachable or add-on or dongle type of receiver component to enable the user to power or charge the product or device.

Induction is generally defined as a generation of electromotive force (EMF) or voltage across a closed electrical path in response to a changing magnetic flux through any surface bounded by that path. The term magnetic resonance has been used recently for inductive power transfer where the charger and receiver may be relatively far apart. Since this is in general a form of induction, the term induction is used herein; however the terms induction and magnetic resonance are sometimes used interchangeably herein to indicate that the method of power transfer may be in either domain, or a combination thereof.

In accordance with various embodiments, an inductive power transmitter employs one or more magnetic induction coil(s) transmitting energy to one or more receiving coil(s) in or on a device or product, case, battery door, or attachable or add-on component, including, e.g., attachments such as a dongle or a battery inside or outside of device or attached to device through a connector and/or a wire, or stand-alone placed near the power transmitter platform. The receiver can be an otherwise incomplete device that receives power wirelessly and is intended for installation or attachment in or on a final product, battery or device to be powered or charged. Alternatively, the receiver can be a complete device that is intended for connection to another device, product or battery, directly by a wire or wirelessly.

As used herein, the terms wireless charger, wireless power charger, transmitter, and inductive or magnetic resonance power charger are sometimes used interchangeably.

As used herein, the terms firmware, software or instruction set are sometimes used interchangeably and refers to any set of machine-readable instructions (most often in the form of a computer program) that directs a computer, microcontroller or other processor to perform specific operation.

In accordance with an embodiment, the wireless charger can be a flat or curved surface or part that can provide energy wirelessly to a receiver. The charger can be constructed of flexible materials and/or coils, or plastic electronics, to enable mechanical flexibility and bending or folding to save space or for conformity to non-flat surfaces. The wireless charger can be directly powered by an AC power input, DC power, or other power source such as an automobile, bus, motorcycle, truck or other vehicle or train, airplane or boat or ship or other transport system or vehicle power outlet, or through being built into and powered by such transport vehicles or systems, primary (non-rechargeable) or rechargeable battery, solar cell, fuel cell, mechanical (e.g., hand crank, wind, water source), nuclear source or other or another wireless charger or power supply or a combination thereof.

Additionally, in accordance with an embodiment, the wireless charger can be integrated and/or powered by a part such as a rechargeable battery which is itself recharged by another source such as an AC or DC power source, automobile, bus, vehicle, boat or ship or airplane power outlet or vehicle, boat, train or ship or airplane or other transport system or vehicle itself, solar cell, fuel cell, or mechanical (e.g., hand crank, wind, water) or nuclear or other source, or a combination thereof. In instances where the wireless charger is powered by a rechargeable source such as a battery, the battery can also be itself inductively charged by another wireless charger.

In accordance with an embodiment, the wireless charger can be a stand-alone part, device, or product, or can be incorporated into another electric or electronics device, table, desk chair, armrest, TV stand or mount or furniture or vehicle or airplane or marine vehicle or boat or objects such as a table, desk, chair, counter-top, shelving or check out or cashier counters, kiosk, car seat, armrest, car console, car door, netting, cup holder, dashboard, glovebox, airplane tray, computer, laptop, netbook, tablet, display, TV, magnetic, optical or semiconductor storage or playback device such as hard drive, solid state storage drive, optical players, cable or game console, computer pads, toys, clothing, bags or backpack, belt or holster, industrial, medical, dental, military or kitchen counter, area, devices and appliances, phones, cameras, radios, stereo systems, or other medium.

In accordance with an embodiment, the wireless charger can also have other functions built in, or be constructed such that modular and additional capabilities or functions can be added as needed. Some of these capabilities or functions can include an ability to provide higher power, charge more devices, exchange the top surface or exterior box or cosmetics, operate by internal power as described above through use of a battery and/or renewable source such as solar cells, communicate and/or store data from a device, provide communication between the device and, e.g., other devices, the charger and/or a network.

An example is a basic wireless charger that has the ability to be extended to include a rechargeable battery pack to enable operation without external power. Another example can be a wireless charger containing one or more speakers and/or microphone or display and Bluetooth, WiFi, or other connectivity as a module that would enhance the basic charger to allow a mobile phone or music player being charged on the charger to play/stream music or sound or video or carry out a hands-free conversation or video call over the speakers and/or microphone wirelessly through a Bluetooth, WiFi, or other connection. Another example can be a charger product or computer or laptop, or display or TV that also contains a disk drive, solid state memory or other storage device and when a device is placed on the charger, data connectivity through the charger, e.g., Bluetooth, NFC, Felica, WiFi, Zigbee, or Wireless USB, is also established for transfer, synchronizing or update of data or programs occurs to download/upload info, display or play music or video or synchronize data. One exemplary use may be a camera or phone charger whereby many other combinations of products and capabilities may be enabled in combination of charging and other functions.

In accordance with an embodiment, the wireless power charger and or receivers have the ability to have their instruction sets, software and/or firmware updated remotely or locally by a user or automatically to enable enhanced or improved wireless charging capabilities or to add other capabilities or functions including user applications or apps.

In accordance with an embodiment, examples of the types of products or devices that can be powered or charged by the induction transmitter and receiver include, but are not limited to, batteries, cell phones, smart phones, cordless phones, communication devices, pagers, personal data assistants, portable media players, global positioning (GPS) devices, Bluetooth headsets and other devices, heads-up or display glasses, 3-d display glasses, shavers, watches, tooth brushes, calculators, cameras, optical scopes, infrared viewers, computers, laptops, tablets, netbooks, key boards, computer mice, book readers or email devices, pagers, computer monitors, televisions, music or movie players and recorders, storage devices, radios, clocks, speakers, gaming devices, game controllers, toys, remote controllers, power tools, scanners, construction tools, office equipment, robots including vacuum cleaning robots, floor washing robots, pool cleaning robots, gutter cleaning robots or robots used in hospital, clean room, military or industrial environments, industrial tools, mobile vacuum cleaners, medical or dental tools, military equipment or tools, kitchen appliances, mixers, cookers, can openers, food or beverage heaters or coolers such as electrically powered beverage mugs, massagers, adult toys, lights or light fixtures, signs or displays, or advertising applications, electronic magazines or newspapers, or magazines or newspapers containing an electronic part, printers, fax machines, scanners, automobiles, buses, trains, motorcycles or bicycles, personal mobility (e.g., Segway) devices, or other vehicles or mobile transportation machines, and other battery or electrically powered devices or products or a product that is a combination of the products listed above.

In accordance with an embodiment, a receiver or charger can be incorporated into, e.g., a bag, carrier, skin, clothing, case, packaging, product packaging or box, crate, box, display case or rack, table, bottle or device, to enable some function inside the bag, carrier, skin, clothing, case, packaging, product packaging or box, crate, box, display case or rack, table, bottle (such as, e.g. causing a display case or packaging to display promotional information or instructions, or to illuminate) and/or to use the bag, carrier, skin, clothing, case, packaging, product packaging or box, crate, box, stand or connector, display case or rack, table, bottle to power or charge another device or component somewhere on or nearby.

In accordance with an embodiment, the product or device does not necessarily have to be portable and/or contain a battery to take advantage of induction or wireless power transfer. For example, a lighting fixture or a computer monitor that is typically powered by an AC outlet or a DC power supply can be placed on a table top and receive power wirelessly. The wireless receiver can be a flat or curved surface or part that can receive energy wirelessly from a charger; and the receiver and/or the charger can also be constructed of flexible materials and/or coils or plastic electronics, to enable mechanical flexibility and bending or folding to save space or for conformity to non-flat surfaces.

In accordance with various embodiments, many of the types of devices described above contain internal batteries, and the device may or may not be operating during receipt of power. Depending on the degree of charge status of the battery or its presence and the system design, the applied power can provide power to the device, charge its battery or a combination of the above. The terms charging and/or power are sometimes used interchangeably herein to indicate that the received power can be used for either of these cases or a combination thereof. In accordance with various embodiments the terms charger power supply and transmitter are also sometimes used interchangeably herein.

FIG. 1 illustrates a wireless charger or power system, in accordance with an embodiment. As shown in FIG. 1, in accordance with an embodiment, a wireless charger or power system 100 comprises a first charger or transmitter part 102, and a second receiver part 104. The charger and/or transmitter can generate a repetitive power signal pattern (such as a sinusoid or square wave from 10's of Hz to several MHz or even higher, but typically in the 100 kHz to several MHz range) with its coil drive circuit and a coil or antenna for transmission of the power. The charger and/or transmitter can also include a communication and regulation/control system that detects a receiver and/or turns the applied power on or off, and/or modifies the amount of applied power by means such as changing the amplitude, frequency or duty cycle, or a change in the resonant condition, or by varying the impedance (capacitance or inductance) of the charger, or a combination thereof of the applied power signal to the coil or antenna.

In accordance with an embodiment, the charger can be the whole or part of the electronics, coil, shield, or other part of the system required for transmitting power wirelessly. The electronics can comprise discrete components or microelectronics that when used together provide the wireless charger functionality, or comprise one or more Multi-Chip Modules (MCM), or an Application Specific Integrated Circuits (ASIC) chip, computers or Field Programmable Gate Arrays (FPGAs), microprocessor or an Integrated Circuits (IC) or chipsets or microcontrollers (MC) that are specifically designed to function as the whole or a substantial part of the electronics for wireless charger system.

As used herein, the term microcontroller, computer, MCM, ASIC or FPGA, microprocessor or processor is used interchangeably to refer to any system with a central processing unit that is capable of performing a set of instructions or computer programs.

In accordance with an embodiment, the second part of the system is a receiver that includes a coil or antenna to receive power, and a means for changing the received AC voltage to DC voltage, such as rectification and smoothing with one or more rectifiers or, e.g., a bridge or synchronous rectifier and one or more capacitors.

In instances where the voltage at the load does not need to be kept within a tight tolerance or can vary regardless of the load resistance or the resistance of the load is always constant, the rectified and smoothed output of the receiver can be directly connected to a load. Examples of this situation may be in lighting applications, applications where the load is a constant resistance such as a heater or resistor. In these instances, the receiver system can be simple and inexpensive.

In many other instances, the resistance or impedance of the load changes during operation. This includes instances where the receiver is connected to a device whose power needs may change during operation or when the receiver is used to charge a battery. In these instances, the output voltage may need to be regulated so that it stays within a range or tolerance during the variety of operating conditions. In these instances, the receiver can optionally include a regulator such as linear, buck, boost or buck boost regulator and/or switch for the output power. Additionally, the receiver can include or operate a method for the receiver to communicate with the charger.

In accordance with an embodiment, the receiver can optionally include a reactive component (inductor or capacitor) to increase the resonance of the system and a switch to allow switching between a wired and wireless method of charging or powering the product or battery. The receiver can also include optional additional features such as including Near Field Communication (NFC), Bluetooth, WiFi, RFID or other communication and/or verification technology.

In accordance with an embodiment, the charger or transmitter coil and the receiver coil can be formed of any shape desired and can be constructed, e.g., of PCB, wire, Litz wire, or a combination thereof. To reduce resistance, the coils can be constructed of multiple tracks or wires in the PCB and/or wire construction. For PCB construction, the multiple layers can be in different sides of a PCB and/or different layers and layered/designed appropriately to provide optimum field pattern, uniformity, inductance, and/or resistance or Quality factor (Q) for the coil. Various materials can be used for the coil conductor such as different metals and/or magnetic material or plastic conductors. Typically, copper with low resistivity may be used. The design should also take into account the skin effect of the material used at the frequency of operation to preferably provide low resistance.

In accordance with an embodiment, the receiver can be an integral part of a device or battery as described above, or can be an otherwise incomplete device that receives power wirelessly and is intended for installation or attachment in or on the final product, battery or device to be powered or charged, or the receiver can be a complete device intended for connection to a device, product or battery directly by a wire or wirelessly. Examples can include replaceable covers, skins, cases, doors, jackets, surfaces for devices or batteries that would incorporate the receiver or part of the receiver and the received power would be directed to the device through connectors in or on the device or battery or the normal wired connector (or power jack) of the device or battery.

In accordance with an embodiment, the receiver can also be a part or device similar to a dongle that can receive power on or near the vicinity of a charger and direct the power to a device or battery to be charged or powered through a wire and/or appropriate connector. Such a receiver can also have a form factor that would allow it to be attached in an inconspicuous manner to the device such as a part that is attached to the outer surface at the bottom, front, side, or back side of a laptop, netbook, tablet, phone, game player, or other electronic device and route the received power to the input power connector or jack of the device. The connector of such a receiver can be designed such that it has a pass through or a separate connector integrated into it so that a wire cable for providing wired charging/power or communication can be connected to the connector without removal of the connector thus allowing the receiver and its connector to be permanently or semi-permanently be attached to the device throughout its operation and use.

Many other variations of the receiver implementation are possible and the above examples are not meant to be exhaustive.

In accordance with an embodiment, the receiver can also be the whole or part of the electronics, coil, shield, or other part of the system required for receiving power wirelessly. The electronics can comprise discrete components or microcontrollers that when used together provide the wireless receiver functionality, or comprise an MCM or Application Specific Integrate Circuit (ASIC) chip or chipset that is specifically designed to function as the whole or a substantial part of the electronics for wireless receiver system.

In accordance with an embodiment, optional methods of communication between the charger and receiver can be provided through the same coils as used for transfer of power, through a separate coil, through an RF or optical link, through, e.g., RFID, Bluetooth, WiFi, Wireless USB, NFC, Felica, Zigbee, or Wireless Gigabit (WiGig). or through such protocols as defined by the Wireless Power Consortium (WPC), Alliance for Wireless Power (A4WP) or other protocols or standards, developed for wireless power, or other communication protocol, or combination thereof.

In the instance that communication is provided through the power transfer coil, one method for the communication is to modulate a load in the receiver to affect the voltage in the receiver coil and therefore create a modulation in the charger coil parameters that can be detected through monitoring of its voltage or current. Other methods can include frequency modulation by combining the received frequency with a local oscillator signal or inductive, capacitive, or resistive modulation of the output of the receiver coil.

In accordance with an embodiment, the communicated information can be the output or rectified receiver coil voltage, current, power, device or battery status, validation ID for receiver, end of charge or various charge status information, receiver battery, device, or coil temperature, and/or user data such as music, email, voice, photos or video, or other form of digital or analog data used in a device. It can also be a pattern or signal or change in the circuit conditions that is transmitted or occurs to simply notify the presence of the receiver nearby.

In accordance with an embodiment, the data communicated can be any one or more of the information detailed herein, or the difference between these values and the desired value or simple commands to increase or decrease power or simply one or more signals that would confirm presence of a receiver or a combination of the above. In addition, the receiver can include other elements such as a DC to DC converter or regulator such as a switching, buck, boost, buck/boost, or linear regulator. The receiver can also include a switch between the DC output of the receiver coil and the rectification and smoothing stage and its output or the output of the regulator stage to a device or battery or a device case or skin and in cases where the receiver is used to charge a battery or device, the receiver can also include a regulator, battery charger IC or circuitry and/or battery protection circuit and associated transistors. The receiver can also include variable or switchable reactive components (capacitors and/or inductors) that would allow the receiver to change its resonant condition to affect the amount of power delivered to the device, load or battery. The receiver and/or charger and/or their coils can also include elements such as thermistors, magnetic shields or magnetic cores, magnetic sensors, and input voltage filters, for safety and/or emission compliance reasons.

In accordance with an embodiment, the receiver can also be combined with other communication or storage functions such as NFC, WiFi, or Bluetooth. In addition, the charger and or receiver can include components to provide more precise alignment between the charger and receiver coils or antennas. These can include visual, physical, or magnetic components to assist the user in alignment of parts. To implement more positioning freedom of the receiver on the charger, the size of the coils can also be mismatched. For example, the charger can comprise a larger coil size, and the receiver a smaller coil size or vice versa, so that the coils do not have to be precisely aligned for power transfer.

In simpler architectures, there may be minimal or no communication between the charger and receiver. For example, a charger can be designed to be in a standby power transmitting state, and any receiver in close proximity to it can receive power from the charger. The voltage, power, or current requirements of the device or battery connected to the receiver circuit can be unregulated, or regulated or controlled completely at the receiver or by the device attached to it. In this instance, no regulation or communication between the charger and receiver may be necessary.

In a variation of this, the charger can be designed to be in a state where a receiver in close proximity would bring it into a state of power transmission. Examples of this would be a resonant system where inductive and/or capacitive components are used, so that when a receiver of appropriate design is in proximity to a charger, power is transmitted from the charger to a receiver; but without the presence of a receiver, minimal or no power is transmitted from the charger.

In a variation of the above, the charger can periodically be turned on to be driven with a periodic pattern (a ping process) and if a receiver in proximity begins to draw power from it, the charger can detect power being drawn from it and would stay in a transmitting state. If no power is drawn during the ping process, the charger can be turned off or placed in a stand-by or hibernation mode to conserve power and turned on and off again periodically to continue seeking a receiver. In accordance with an embodiment, to minimize power draw in between ping processes, the entire charger system with the exception of the microcontroller and optionally a regulator powering it, can be shut down or put into a low power mode to minimize power use.

In accordance with an embodiment, the power section (coil drive circuit and receiver power section) can be a resonant converter, resonant, full bridge, half bridge, E-class, zero voltage or current switching, flyback, or any other appropriate power supply topology.

Figure 2:
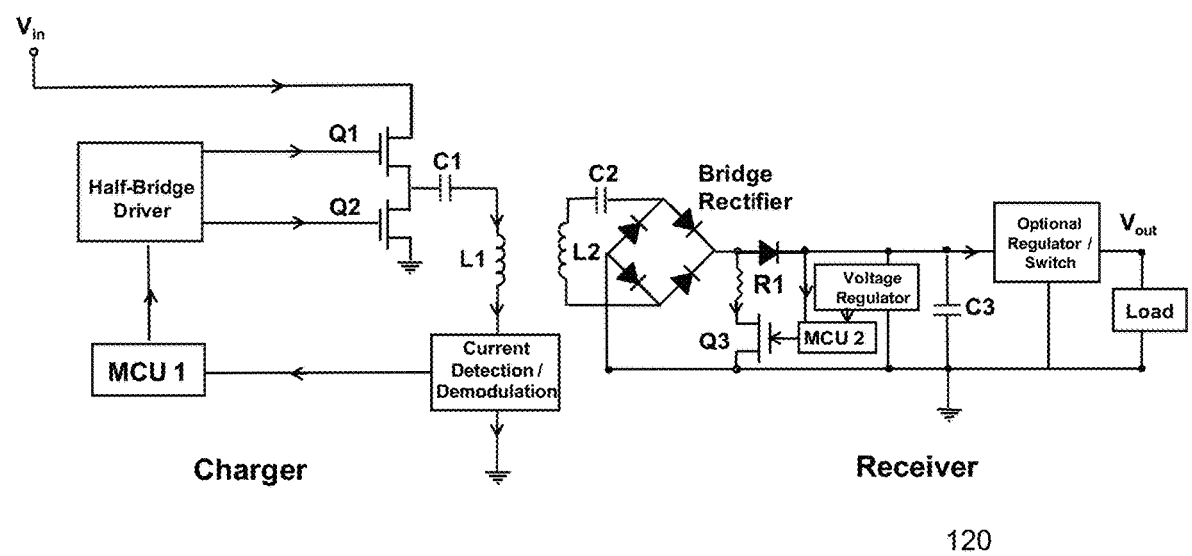
FIG. 2 illustrates a more detailed view of a wireless charger system, in accordance with an embodiment.

FIG. 2 illustrates a more detailed view of a wireless charger system 120, in accordance with an embodiment, with a resonant converter geometry, wherein a pair of transistors Q1 and Q2 (such as FETs, MOSFETs, or other types of switch) are driven by a half-bridge driver IC and the voltage is applied to the coil L1 through one or more capacitors shown as C1. In accordance with an embodiment, the receiver includes a coil and an optional capacitor (for added efficiency) shown as C2 that may be in series or in parallel with the receiver coil L2. The charger and/or receiver coils can also include impedance matching circuits and/or appropriate magnetic material layers behind (on the side opposite to the coil surfaces facing each other) them to increase their inductance and/or to shield the magnetic field leakage to surrounding area. The charger and/or receiver can also include impedance matching circuits to optimize/improve power transfer between the charger and receiver.

In several of the embodiments and figures described herein, the resonant capacitor C2 in the receiver is shown in a series architecture. This is intended only as a representative illustration, and this capacitor can be used in series or parallel with the receiver coil. Similarly, the charger is generally shown in an architecture where the resonant capacitor is in series with the coil. System implementations with the capacitor C1 in parallel with the charger coil are also possible.

In accordance with an embodiment, the charger also includes a circuit that measures the current through and/or voltage across the charger coil (in this instance a current sensor is shown in the figure as an example). Various demodulation methods for detection of the communication signal on the charger current or voltage are available. This demodulation mechanism can be, e.g., an AM or FM receiver (depending on whether amplitude or frequency modulation is employed in the receiver modulator) similar to a radio receiver tuned to the frequency of the communication or a heterodyne detector.

In accordance with an embodiment, the microcontroller unit (MCU) in the charger (MCU1) is responsible for understanding the communication signal from a detection/demodulation circuit and, depending on the algorithm used, making appropriate adjustments to the charger coil drive circuitry to achieve the desired output voltage, current or power from the receiver output.

In addition, in accordance with an embodiment, the MCU1 is responsible for processes such as periodic start of the charger to seek a receiver at the start of charge, keeping the charger on when a receiver is found and accepted as a valid receiver, continuing to apply power and making necessary adjustments, and/or monitoring temperature or other environmental factors, providing audio or visual indications to the user on the status of charging or power process, or terminating charging or application of power due to end of charge or customer preference or over temperature, over current, over voltage, or some other fault condition or to launch or start another program or process.

In addition, in accordance with an embodiment, the charger can be built into a car or other vehicle or transport system such as trains, airplanes, etc., and when a valid receiver and/or an NFC, RFID or other ID mechanism integrated into or on a mobile device, its case or skin, dongle or battery is found, the charger can activate some other functions such as Bluetooth or WiFi connectivity to the device, displaying the device identity or its status or state of charge on a display. More advanced functions can also be activated or enabled by this action. Examples of such contextually aware functionality include using the device as an identification mechanism for the user and setting the temperature of the car or the driver or passenger side to the user's optimum pre-programmed temperature, setting the mirrors and seats to the preferred setting, starting a radio station or music preferred by the user, replicating a mobile device display and/or functionality on a TV or other monitor or touchscreen, etc. as described in U.S. Patent Publication No. 20110050164, which application is herein incorporated by reference.

In accordance with an embodiment, the charger and/or vehicles or devices or batteries being charged or attached to may synchronize, upload or download user data, instruction sets, firmware or software or store such information between them or a remote or local third device or system through a wired or wireless connection and/or network.

In accordance with an embodiment, the wireless charger and/or the receiver can include the Hardware and software/firmware to perform such additional functions according to a User Application Layer (UAL) instruction set and associated hardware to enable contextually or context aware functions.

In accordance with an embodiment, the charger can also include an RF signal amplifier/repeater so that placement of a mobile device such as a mobile phone, or tablet, would provide close coupling and/or turning on of the amplifier and its antenna so that a better signal reception for communication such as cell phone calls can be obtained. Such signal boosters that include an antenna mounted on the outside of a car, a bi-directional signal amplifier and a repeater antenna inside a car are increasingly common. The actions launched or started by setting a device on a charger can also be different in different environments. Examples can include routing a mobile phone call or music or video from a smart phone to the speakers and microphones or video monitors or TV, computer, laptop, tablet, in a car, home, or office. Other similar actions or different actions can be provided in other environments.

In accordance with an embodiment, it may be useful in addition to the communication signal to detect the DC value of the current through the charger coil. For example, faults may be caused by insertion or presence of foreign objects such as metallic materials between the charger and receiver. These materials may be heated by the application of the power and can be detected through detection of the charger current or temperature or comparison of input voltage, current, or power to the charger and output voltage, current, or power from the receiver and concluding that the ratio is out of normal range and extra power loss due to unknown reasons is occurring. In these conditions or other situations such as abnormal charger and/or receiver heating, the charger can be programmed to declare a fault condition and shut down and/or alert the user or take other actions.

In accordance with an embodiment, once the charger MCU has received a signal and decoded it, it can act to provide more or less power to the charger coil. This can be accomplished through known methods of adjusting the frequency, duty cycle or input voltage to the charger coil or a combination of these approaches. Depending on the system and the circuit used, the MCU can directly adjust the bridge driver or an additional circuit such as a frequency oscillator may be necessary to drive the bridge driver or the FETs.

FIG. 2 also illustrates a typical circuit for the receiver in accordance with an embodiment. In accordance with an embodiment, the receiver circuit can include a capacitor C2 in parallel or series with the receiver coil to produce a tuned receiver circuit. This circuit is known to increase the efficiency of a wireless power system. The rectified and smoothed (through a bridge rectifier and capacitors) output of the receiver coil and optional capacitor is either directly or through a switch or regulator applied to the output. A microcontroller is used to measure various values such as output voltage, current, temperature, state of charge, battery full status, end of charge, and to report back to the charger to provide a closed loop system with the charger as described above. In the circuit shown in FIG. 2, the receiver MCU communicates back to the charger by modulating the receiver load by rapidly closing and opening a switch in series with a modulation load at a pre-determined speed and coding pattern. This rapid load modulation technique at a frequency distinct from the power transfer frequency can be easily detected by the charger. In accordance with an embodiment, this modulation load can be capacitive, inductive or resistive (as shown in FIG. 2 for simplicity), or a combination thereof.

As an example, if one assumes that the maximum current output of the receiver is 1000 mA and the output voltage is 5 V for a maximum output of 5 W; in this case, the minimum load resistance is 5 ohms. A modulation load resistor of several ohms (500 to 10 ohms or smaller) would be able to provide a large modulation depth signal on the receiver coil voltage. Other methods of communication through varying the reactive component of the impedance can also be used. The modulation scheme shown in FIG. 2 is shown only as a representative method and is not meant to be exhaustive. As an example, the modulation can be achieved capacitively, by replacing the resistor with a capacitor. In this instance, the modulation by the switch in the receiver provides the advantage that by choosing the modulation frequency appropriately, it is possible to achieve modulation and signal communication with the charger coil and circuitry, with minimal power loss (compared to the resistive load modulation).

In accordance with an embodiment, the receiver illustrated in FIG. 2 also shows an optional DC regulator that is used to provide constant stable voltage to the receiver MCU. This voltage supply may be necessary to avoid drop out of the receiver MCU during startup conditions where the power is varying largely or during changes in output current and also to enable the MCU to have a stable voltage reference source so it can measure the output voltage accurately. In addition, in accordance with an embodiment, an optional output regulator and/or switch can be added to provide stable regulated output voltage. To avoid voltage overshoots during placement of a receiver on a charger or rapid changes in load condition, a voltage limiter circuit or elements such as Transient Voltage Suppressors, Zener diodes or regulators or other voltage limiters can also be included in the receiver before the output regulator/switch stage.

In the above description, a uni-directional communication (from the receiver to the charger) is generally described. However, in accordance with an embodiment, this communication can also be bi-directional, and data can be transferred from the charger to the receiver through modulation of the voltage or current in the charger coil and read back by the microcontroller in the receiver detecting a change in, e.g., the voltage or current.

While a system for communication between the charger and receiver through the power transfer coil or antenna is described above, in accordance with an embodiment the communication can also be implemented through a separate coil, a radio frequency link (am or fm or other communication method), an optical communication system or a combination of the above.

Figure 3:
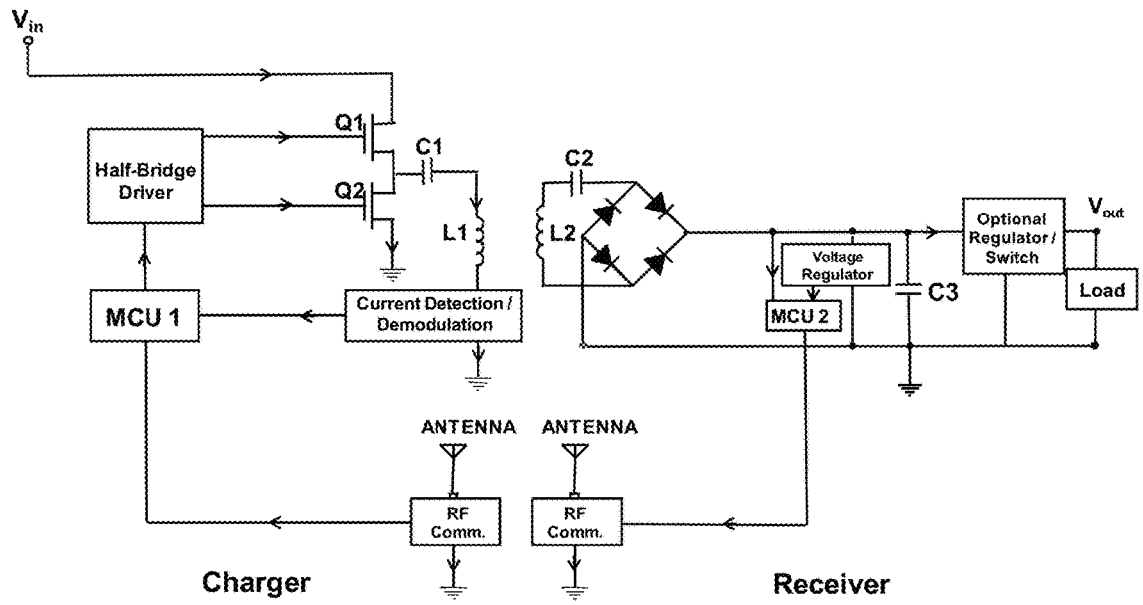
FIG. 3 illustrates a system in accordance with an embodiment, wherein a dedicated channel for uni-directional or bi-directional communication between the charger and receiver is implemented for validation and/or regulation purposes.

In accordance with an embodiment, the communication in any of these methods can also be bi-directional rather than uni-directional as described above. As an example, FIG. 3 illustrates a system 130 in accordance with an embodiment, wherein a dedicated RF channel for uni-directional or bi-directional communication between the charger and receiver is implemented for validation and/or regulation purposes. This system is similar to the system shown in FIG. 2, except rather than load modulation being the method of communication, the MCU in the receiver transmits the necessary information over an RF communication path. A similar system with LED or laser transceivers or detectors and light sources can be implemented. Advantages of such system include that the power received is not modulated and therefore not wasted during communication and/or that no noise due to the modulation is added to the system.

One of the disadvantages of the circuit shown in FIG. 2 is that, in the receiver circuit shown therein, the current path passes through 2 diodes and suffers 2 voltage drops resulting in large power dissipation and loss. For example, for Schottky diodes with forward voltage drop of 0.4 V, at a current output of 1 A, each diode would lose 0.4 W of power for a combined power loss of 0.8 W for the two in a bridge rectifier configuration. For a 5 V, 1 A output power (5 W), this 0.8 W of power loss presents a significant amount of loss (16%) just due to the rectification system.

Figure 4:
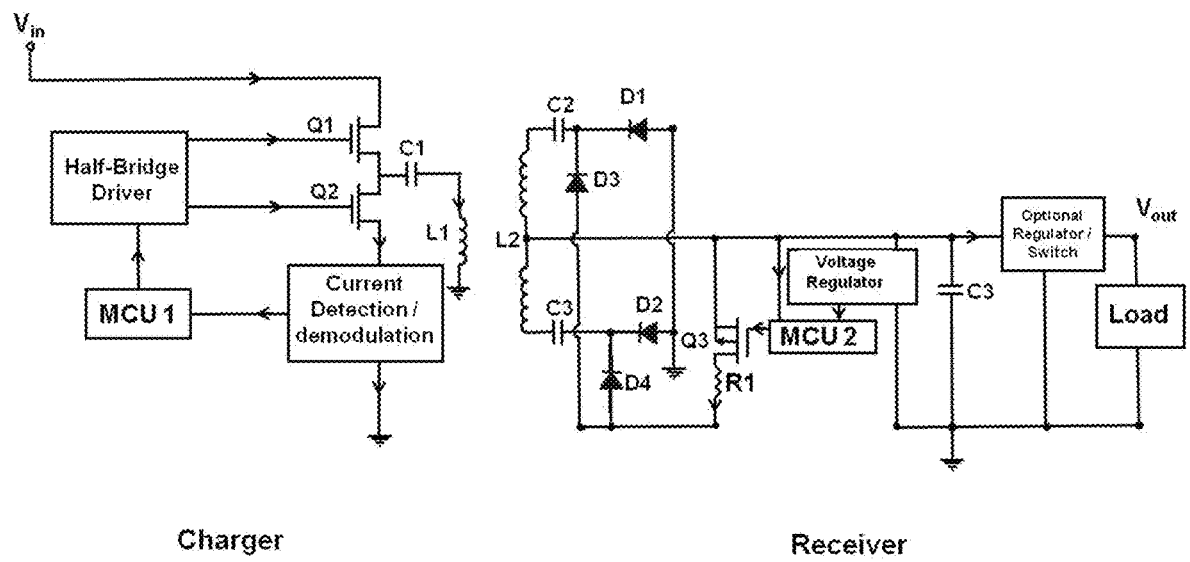
FIG. 4 illustrates a center-tapped receiver in accordance with an embodiment.

In accordance with an embodiment, an alternative is to use a center-tapped receiver 140 as illustrated in FIG. 4, wherein during each cycle current passes only through one part of the coil and one diode in the receiver, which therefore halves the rectification losses. Such a center tapped coil can be implemented in a wound-wire geometry with two sections of a wound wire or a printed circuit board coil or with a double or multi-sided sided PCB coil or a combination or even a stamped, etched or otherwise manufactured coil or winding.

Figure 5:
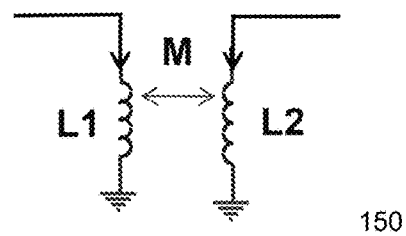
FIG. 5 illustrates how the charger and receiver coils can be represented by their respective inductances.

In any of the systems described above, as illustrated in FIG. 5, the charger and receiver coils can be represented by their respective inductances 150 by themselves (L1 and L2) and the mutual inductance between them M which is dependent on the material between the two coils and their position with respect to each other in x, y, and z dimensions. The coupling coefficient between the coils k is given by:

$$k = M/(L1*L2)^{1/2}$$

The coupling coefficient is a measure of how closely the 2 coils are coupled and may range from 0 (no coupling) to 1 (very tight coupling). In coils with small overlap, large gap between coils or dissimilar coils (e.g., in size, number of turns, coil winding or pattern overlap), this value can be smaller than 1.

Figure 6:
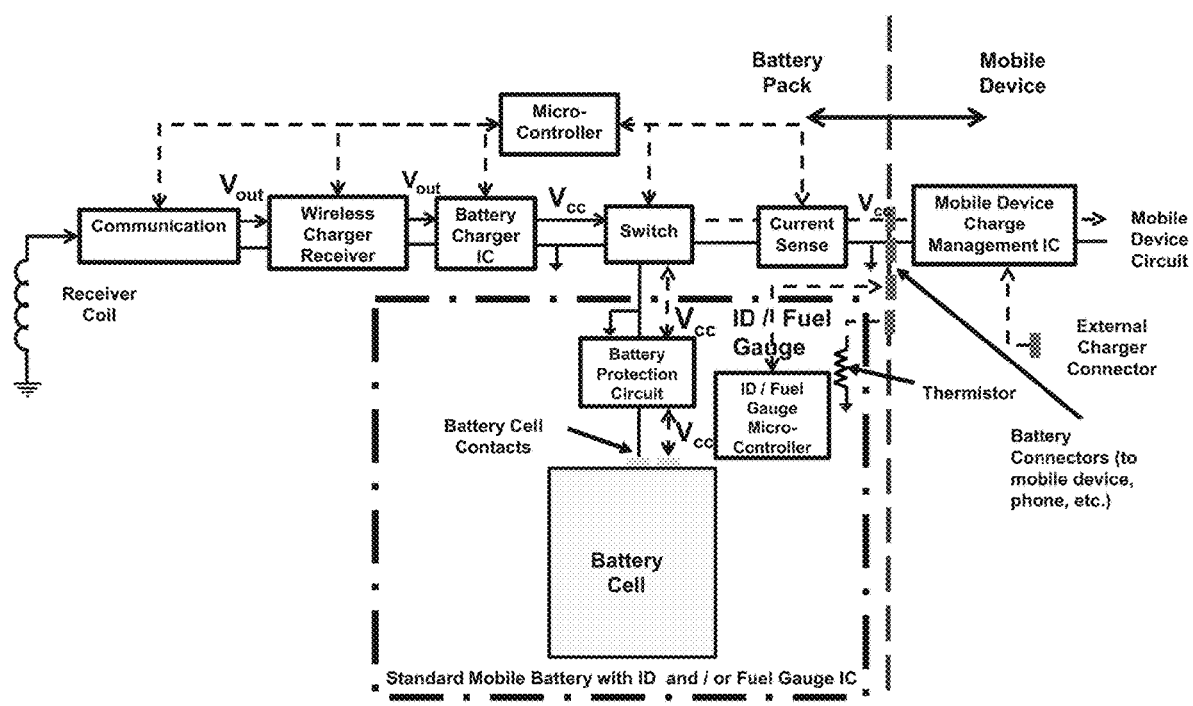
FIG. 6 illustrates a wirelessly powered battery pack and receiver, in accordance with an embodiment.

FIG. 6 illustrates a wirelessly powered battery pack and receiver 160 in accordance with an embodiment. The components of a typical common battery pack (e.g., battery cell, protection circuit.) used in a battery device used in applications such as mobile phone, are shown inside the dashed lines. The components outside the dashed lines are additional components that are included to enable safe wireless and wired charging of a battery pack.

In accordance with an embodiment, a battery pack can have four or more external connector points that interface with mobile device pins in a battery housing or with an external typical wired charger.

Figure 7:
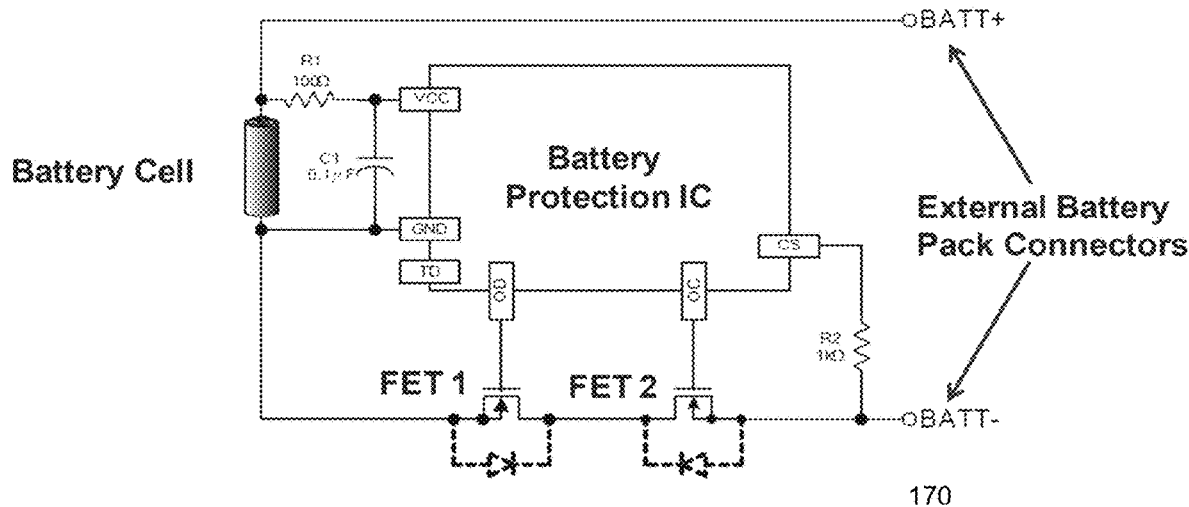
FIG. 7 illustrates an embodiment including a battery cell.

In accordance with an embodiment 170, the battery cell can be connected as illustrated in FIG. 7 to two of these connectors (shown in the figure as BATT+ and BATT−) through a protection circuit comprising a battery protection IC that protects a battery from over-current and under or over voltage. A typical IC can be Seiko 8241 IC that uses 2 external Field Effect Transistors (FETs) as shown in FIG. 7 to prevent current going from or to the battery cell (on the left) from the external battery pack connectors if a fault condition based on over current, or battery cell over or under voltage is detected. This provides safety during charging or discharging of the battery. In addition, a battery pack can include a PTC conductive polymer passive fuse. These devices can sense and shut off current by heating a layer inside the PTC if the amount of current passing exceeds a threshold. The PTC device is reset once this current falls and the device cools.

In accordance with an embodiment, the battery pack can contain a thermistor, which the mobile device checks through one other connector on the battery pack to monitor the health of the pack, and in some embodiments an ID chip or microcontroller that the mobile device interrogates through another connector to confirm an original battery manufacturer or other information about the battery. Other connectors and functions can be included in a battery pack to provide accurate battery status and/or charging information to a device being powered by a battery pack or a charger charging the battery pack.

In addition to the components described above, in accordance with various embodiments, the receiver circuit can comprise a receiver coil that can be a wound wire and/or PCB coil as described above, optional electromagnetic shielding between the coil and the metal body of the battery, optional alignment assisting parts such as magnets, a receiver communication circuit (such as the resistor and FET for load modulation shown in FIGS. 2 and 4), a wireless power receiver (such as rectifiers and capacitors as described above), and an optional Battery charger IC that has a pre-programmed battery charging algorithm.

Figure 8:
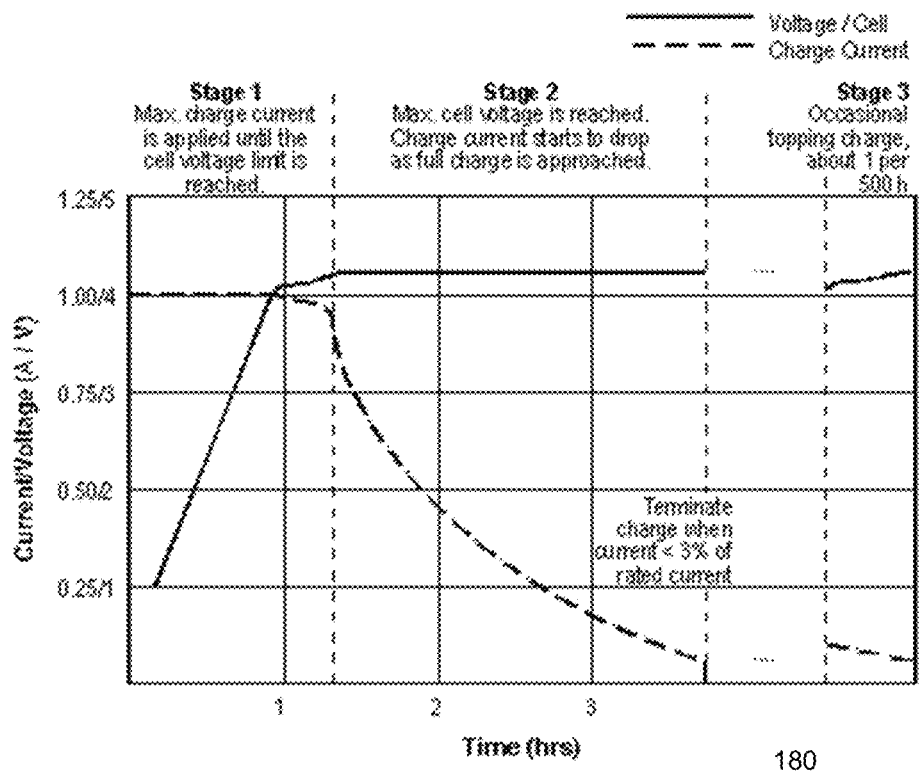
FIG. 8 illustrates a typical charge cycle or a Lithium Ion (Li-Ion) battery.

Generally, each type of battery and chemistry requires a pre-determined optimized profile for charging of that battery type. For example, a typical charge cycle 180 for a Lithium Ion (Li-Ion) is illustrated in FIG. 8. Such a battery can be charged up to a value of 4.2 V at full capacity. The battery should be charged according to the guidelines of the manufacturer. For a battery of capacity C, the cell may typically be charged at the rate IC. In Stage 1, the maximum available current is applied and the cell voltage increases until the cell voltage reaches the final value (4.2 V). In that case, the charger IC switches to Stage 2 where the charger IC switches to Constant Voltage charging where the cell voltage does not change but current is drawn from the source to further fill up the battery. This second Stage may take 1 or more hours and is necessary to fully charge the battery. Eventually, the battery will draw little (below a threshold) or no current. At this stage, the battery is full and the charger may discontinue charging. The charger IC can periodically seek the condition of the battery and top it off further if the battery has drained due to stand-by.

In accordance with an embodiment, such multiple stages of battery charging can be implemented in software or firmware with the wireless power charger and receiver microcontrollers monitoring, e.g., the battery cell voltage, current, and working in tandem and to provide appropriate, e.g., voltage or current, for safe charging for any type of battery.

In accordance with an embodiment, in the approach shown in FIG. 6, a battery charger IC chip that has specialized battery charging circuitry and algorithm for a particular type of battery can be employed. These charger ICs (with or without fuel gauge capability to accurately measure battery status) are available for different battery chemistries and are included in most mobile devices with mobile batteries such as mobile phones. They can include such safety features as a temperature sensor, open circuit shut off, etc. and can provide other circuits or microcontrollers such useful information as end of charge signal, signaling for being in constant current or voltage (stage 1 or 2 above, etc.). In addition, some of these ICs allow the user to program and set the maximum output current to the battery cell with an external resistor across 2 pins of the IC.

In accordance with an embodiment, the wirelessly charged battery pack in addition includes a micro-controller that coordinates and monitors various points and can also include thermal sensors on the wireless power coil, battery cell and/or other points in the battery pack. The microcontroller also can communicate to the charger and can also monitor communication from the charger (in case of bi-directional communication). Typical communication through load modulation is described above.

In accordance with an embodiment, another aspect of a wirelessly charged battery pack can be an optional external/internal switch. A battery pack can receive power and be charged wirelessly or through the connectors of a battery pack.

For example, when such a battery pack is used in a mobile phone, the user may wish to place the phone on a wireless charger or plug the device in to a wired charger for charging or charge the device as well as synchronize or upload and/or download data or other information. In this instance, it may be important for the battery pack to recognize current incoming to the battery pack and to take some sort of action. This action can include, e.g. notifying the user, shutting off the wired charger by a switch or simply shutting down the charger IC and sending a signal back through the microcontroller and modulating the current back to the charger that a wired charger is present (in case priority is to be given to the wired charger) or conversely to provide priority to the wireless charger and shut off wired charger access to battery when the wireless charger is charging the battery. In either instance, a protocol for handling the presence of two chargers simultaneously can be pre-established and implemented in hardware and/or firmware.

In accordance with an embodiment, the wireless charging of a battery occurs with current flowing into the battery through the battery contacts from the mobile device. Typically, such current is provided by an external DC supply to the mobile device (such as an AC/DC adaptor for a mobile phone) and the actual charging is handled by a charger IC chip or power management IC inside the mobile device that in addition to charging the battery, measures the battery's state of charge, health, verifies battery authenticity, and displays charge status through e.g., LEDs, display, to a user. In accordance with an embodiment, the system may include a current sense circuit at one of the battery pack contacts to measure and sense the direction of current flow into or out of the battery. In situations where the current is flowing inwards (i.e. the battery is being externally charged through a wired charging connection, and/or through a mobile device), the micro-controller can take the actions described above and shut off wireless charging or conversely, provide priority to wireless charging and if it is present, allow or disallow wired charging as the implementation requires.

In many applications, it may be important to include a feature that can inform a mobile device user about the state of charge of a battery pack in the device. To enable an accurate measurement of the remaining battery charge, several gas gauging techniques can be implemented, in general by incorporating a remaining charge measurement IC or circuitry in the battery or in the device.

In accordance with an embodiment, the mobile device can also include a Power Management Integrated Circuit (PMIC) or a fuel or battery gauge that communicates with the wirelessly chargeable battery and measures its degree of charge and display this status on the mobile device display or inform the user in other ways. In another embodiment, this information is transmitted to the charger and also displayed on the charger. In typical circumstances, a typical fuel gauge or PMIC can use, battery voltage/impedance, etc., as well as measurement of the current and time for the current entering the mobile device (coulomb counting) to determine the status of the battery charge. However, in a wirelessly charged system, this coulomb counting may have to be carried out in the battery rather than in the mobile device, and then communicated to the mobile device or the charger, since the charge current is entering the battery directly through the onboard wireless power receiver and circuitry.

In accordance with an embodiment, the communication between the mobile device and the battery is through the connectors of the battery and may involve communication with an on-board microcontroller in the battery pack. In accordance with an embodiment, the wirelessly chargeable battery pack can include appropriate microcontroller and/or circuitry to communicate with the mobile device or wireless charger circuitry and update its state of charge, even though no current may be externally applied (through a wired power supply or charger) to the mobile device and the battery is charged wirelessly.

In simpler fuel gauge techniques, the battery voltage, impedance, etc. can be used to determine battery charge status, and that in turn can be accomplished by performing appropriate measurements by the mobile device circuitry through battery connector points or by appropriate circuitry that can be incorporated in the wirelessly chargeable battery pack and/or in the mobile device or its PMIC or circuitry. In the embodiment illustrated in FIG. 6, a microcontroller or circuit is included inside the battery pack to accomplish the fuel gauge task and report the state of charge to the device. This circuitry can be the same, or different, from an ID chip used to identify the battery and can communicate either through a common battery connector, or a separate one.

In accordance with an embodiment, the firmware in the receiver micro-controller plays a key role in the operation of this battery pack. The micro-controller can measure voltages and currents, flags, and temperatures at appropriate locations for proper operation. In accordance with one embodiment, by way of example, the micro-controller can measure the value of Vout from the rectifier circuit and attempt to keep this constant throughout the charging cycle thereby providing a stable regulated DC supply to the charger IC chip. The microcontroller can report the value of this voltage or error from a desired voltage (e.g., 5V) or simply a code for more or less power back to the charger in a binary or multi-level coding scheme through a load modulation or other scheme (e.g., RF communication, NFC, Bluetooth, as described earlier) back to the charger. The charger can then take action through adjustment of input voltage to the charger coil, adjustment of the frequency or duty cycle of the AC voltage applied to the charger coil to bring the Vout to within required voltage range or a combination of these actions or similar methods.

In accordance with an embodiment, the micro-controller throughout the charging process may monitor the end of charge and/or other signals from charger and/or protection circuit and the current sense circuit (used to sense battery pack current direction and value) to take appropriate action. Li-Ion batteries, for example, need to be charged below a certain temperature for safety reasons. In accordance with an embodiment, it is therefore desirable to monitor the cell, wireless power receiver coil or other temperature and to take appropriate action, such as to terminate charging or lower charging current, if a certain maximum temperature is exceeded.

During charging, as shown in FIG. 8, the battery cell voltage increases, in this example, from 3 V or lower, to 4.2 V, as it is charged. The Vout of the wireless power receiver is input to a charger IC and if this Vout is kept constant (e.g., 5V), a large voltage drop (up to 2 V or more) can occur across this IC especially during Stage 1 where maximum current is applied. With charging currents of up to 1 A, this may translate to up to 2 Watts of wasted power/heat across this IC that may contribute to battery heating. In accordance with an embodiment, it is therefore desirable to implement a strategy whereby the Vout into the charger IC tracks the battery voltage thereby creating a smaller voltage drop and therefore loss across the charger IC. This can provide a significant improvement in performance, since thermal performance of the battery pack is important.

In accordance with an embodiment, the communication between the receiver and charger can follow a pre-determined protocol, including e.g., baud rate, modulation depth, and a pre-determined method for hand-shake, establishment of communication, and signaling, as well as optionally methods for providing closed loop control and regulation of, e.g., power, voltage, in the receiver.

Figure 9:
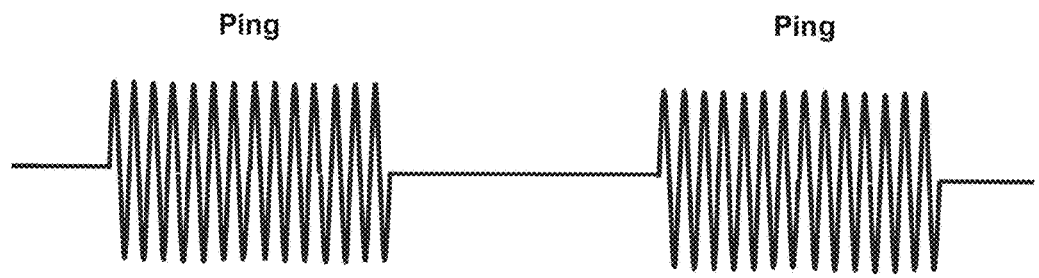
FIG. 9 illustrates a wireless power system operation, in accordance with an embodiment.

In accordance with an embodiment, operation 190 of a wireless power system as illustrated in FIG. 9 can be as follows: the charger periodically activates the charger coil driver and powers the charger coil with a drive signal of appropriate frequency. During this 'ping' process, if a receiver coil is placed on top or close to the charger coil, power is received through the receiver coil and the receiver circuit is energized. The receiver microcontroller is activated by the received power and begins to perform an initiation process whereby the receiver ID, its presence, power or voltage requirements, receiver or battery temperature or state of charge and/or other information is sent back to the charger. If this information is verified and found to be valid, then the charger proceeds to provide continuous power to the receiver. The receiver can alternately send an end of charge, over-temperature, battery full, or other messages that will be handled appropriately by the charger and actions performed. The length of the ping process should be configured to be of sufficient length for the receiver to power up its microcontroller and to respond back and for the response to be received and understood. The length of time between the pings can be determined by the implementation designer. If the ping process is performed often, the stand-by power use of the charger is higher. Alternately, if the ping is performed infrequently, the system will have a delay before the charger discovers a receiver nearby. So, in practice, a balance must be achieved.

Alternately, in accordance with an embodiment, the ping operation can be initiated upon discovery of a nearby receiver by other means. This provides a very low stand-by power use by the charger and can be performed by including a magnet in the receiver and a magnetic sensor in the charger or through optical, capacitive, weight, NFC or Bluetooth, RFID or other RF communication or other methods for detection.

Alternatively, in accordance with an embodiment, the system can be designed or implemented to be always ON (i.e., the charger coil is powered at an appropriate drive frequency) or pinged periodically and presence of the receiver coil brings the coil to resonance with the receiver coil and power transfer occurs. The receiver in this case may not even contain a microcontroller and act autonomously and may simply have a regulator in the receiver to provide regulated output power to a device, its skin, case, or battery. In those embodiments in which periodic pinging is performed, the presence of a receiver can be detected by measuring a higher degree of current flow or power transfer or other means and the charger can simply be kept on to continue transfer of power until either the power drawn falls below a certain level or an end of charge and/or no device present is detected.

In another embodiment, the charger can be in an off or standby, or low or no power condition, until a receiver is detected by means of its presence through a magnetic, RF, optical, capacitive or other methods. For example, in accordance with an embodiment the receiver can contain an RFID chip and once it is present on or nearby the charger, the charger would turn on or begin pinging to detect a receiver.

Figure 10:
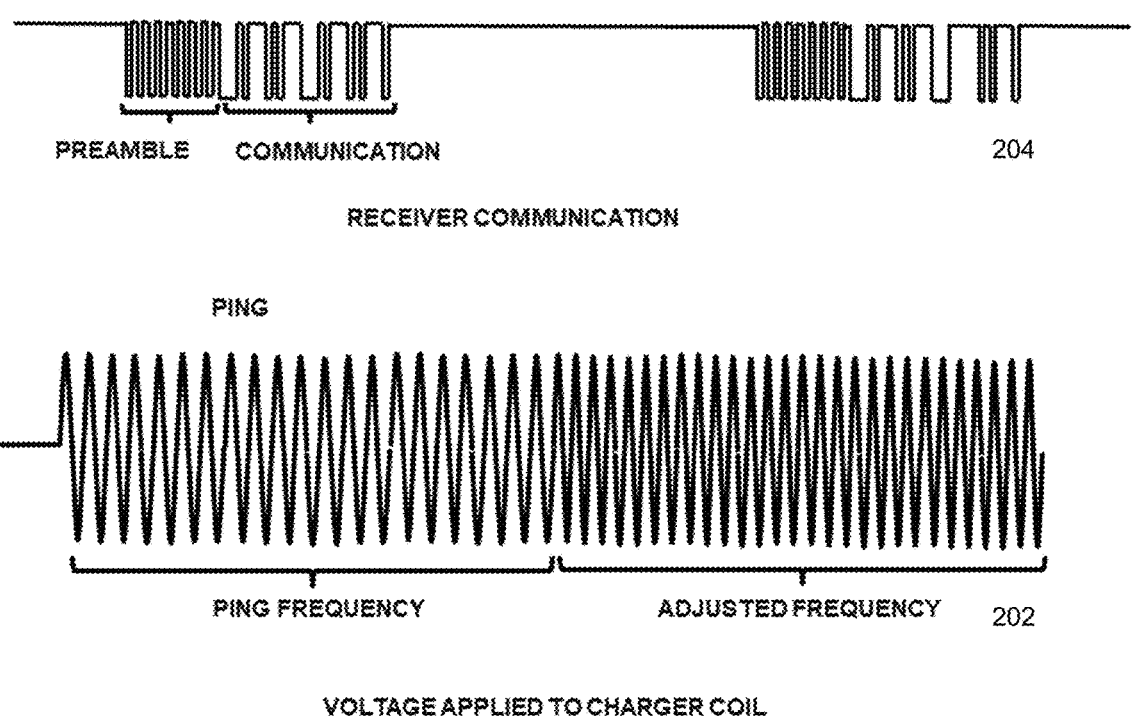
FIG. 10 illustrates an example of the communication process and regulation of power and/or other functions, in accordance with an embodiment.

In accordance with an embodiment, the protocol used for communication can be any of, e.g., common RZ, NRZ, Manchester code, used for communication. An example of the communication process and regulation of power and/or other functions is illustrated in FIG. 10. In accordance with an embodiment, the charger can periodically start and apply a ping voltage 200 of pre-determined frequency and length to the charger coil (shown in the lower illustration 202 in FIG. 10). The receiver is then activated, and can begin to send back communication signals (shown in the upper illustration 204 of FIG. 10). The communication signal can include an optional preamble that is used to synchronize the detection circuit in the charger and prepare it for detection of communication. A communication containing a data packet can then follow, optionally followed by checksum and parity bits. Similar processes are used in communication systems and similar techniques can be followed. In accordance with an embodiment, the actual data packet can include information such as an ID code for the receiver, received voltage, power, or current values, status of the battery, amount of power in the battery, battery or circuit temperature, end of charge or battery full signals, presence of external wired charger, or any combination of the above. Also, this packet can include the actual voltage, power, current, value or the difference between the actual value and the desired value or some encoded value that will be useful for the charger to determine how best to regulate the output.

Alternatively, in accordance with an embodiment, the communication signal can be a pre-determined pattern that is repetitive and simply lets the charger know that a receiver is present and/or that the receiver is a valid device within the power range of the charger. Any combination of systems can be designed to provide the required performance.

In accordance with an embodiment, in response to the receiver providing information regarding, e.g., output power or voltage, the charger can modify the voltage, frequency, duty cycle of the charger coil signal, or a combination of the above. The charger can also use other techniques to modify the power out of the charger coil and to adjust the received power. Alternatively, the charger can simply continue to provide power to the receiver if an approved receiver is detected and continues to be present. The charger can also monitor the current into the charger coil and/or its temperature to ensure that no extra-ordinary fault conditions exist. One example of this type of fault may be if instead of a receiver, a metal object is placed on the charger.

In accordance with an embodiment, the charger can adjust one or more parameters to increase or decrease the power or voltage in the receiver, and then wait for the receiver to provide further information before changing a parameter again, or it can use more sophisticated Proportional Integral Derivative (PID) or other control mechanism for closing the loop with the receiver and achieving output power control. Alternatively, as described above, the charger can provide a constant output power, and the receiver can regulate the power through a regulator or a charger IC or a combination of these to provide the required power to a device or battery.

Various manufacturers can use different encodings, and also bit rates and protocols. The control process used by different manufacturers can also differ, further causing interoperability problems between various chargers and receivers. A source of interoperability differences can be the size, shape, and number of turns used for the power transfer coils. Furthermore, depending on the input voltage used, the design of a wireless power system can step up or down the voltage in the receiver depending on the voltage required by a device by having appropriate number of turns in the charger and receiver coils. However, a receiver from one manufacturer may then not be able to operate on another manufacturer charger due to these differences in designs employed. It is therefore beneficial to provide a system that can operate with different receivers or chargers and can be universal.

The resonant frequency, F of any LC circuit is given by:

$$F = 1/2\pi LC$$

where L is the Inductance of the circuit or coil in Henries and C is the Capacitance in Farads. For the system shown in FIG. 2, one may use the values of C1 and L1 in the above calculation for a free running charger and as a Receiver is brought close to this circuit, this value is changed by the mutual coupling of the coils involved. In those instances that a ferrite shield layer is used behind a coil in the charger and/or receiver, the inductance of the coil is affected by the permeability of the shield and this modified permeability should be used in the above calculation.

In accordance with an embodiment, to be able to detect and power/charge various receivers, the charger can be designed such that the initial ping signal is at such a frequency range to initially be able to power and activate the receiver circuitry in any receiver during the ping process. After this initial power up of the receiver, the charger communication circuit should be able to detect and understand the communication signal from the receiver. Many microcontrollers are able to communicate in multiple formats and may have different input pins (or a single input pin) that can be configured differently (or individually) to simultaneously receive the communication signal and synchronize and understand the communication at different baud rates and protocols. In accordance with an embodiment, the charger firmware can then decide on which type of receiver is present and proceed to regulate or implement what is required (e.g., end of charge, shut-off, fault condition). Depending on the message received, the charger can then decide to change the charger driver voltage amplitude, frequency, or duty cycle, or a combination of these or other parameters to provide the appropriate regulated output.

In accordance with an embodiment, the charger's behavior can also take into account the difference in the coil geometry, e.g., turns ratio. For example, a charger and receiver pair from one or more manufacturers may require operation of the charger drive voltage at 150 kHz. However, if the same receiver is placed on a charger from another manufacturer or driven with different coil/input voltage combination, to achieve the same output power, the charger frequency may need to be 200 kHz. The charger program can detect the type of receiver placed on it and shift the frequency appropriately to achieve a baseline output power and continue regulating from there. In accordance with an embodiment, the charger can be implemented so that it is able to ping and/or decode and implement multiple communication and regulation protocols and respond to them appropriately. This enables the charger to be provided as part of a multi-protocol system, and to operate with different types of receivers, technologies and manufacturers.

For receivers that contain an onboard regulator for the output power, stability of the input voltage to the regulator is not as critical as a receiver with no output regulator stage, since the regulator performs a smoothing function and keeps the output voltage at the desired level with any load changes. It is however, important not to exceed the maximum rated input voltage of the regulator or to drop below a level required so that the output voltage could no longer be maintained at the required value. However, in general, inclusion of a regulator and/or a charger IC chip (for batteries) reduces the power/voltage regulation requirements at the input to the regulator stage, at the expense of the additional size and cost of this component. In accordance with various embodiments, simpler voltage limiting output stages such as Zener diodes, Trans Voltage Suppressors (TVS) or other voltage limiting or clamping ICs or circuits, can be used. However, these stages simply clamp the maximum voltage level, rather than providing true output stage regulation. In accordance with an embodiment, such components may also be used as a safety mechanism before the output regulator stage. In accordance with another embodiment, one or multiple of these voltage-limiting and regulation stages may be combined with a feedback regulation system as described above, whereby the input voltage to the receiver output regulator and/or the voltage limiting system is monitored and communicated to the charger, so that the charger can maintain this voltage in a desirable range as described earlier. In this manner, a multiple stage regulation can be created to provide additional safety and reliability.

While the system above describes a system wherein the communication is primarily through the coil, as described earlier, communication can also be implemented through a separate coil, RF, optical system or a combination of the above. In such circumstances, a multi-protocol system can also be used to interoperate between systems with different communication and/or control protocols, or different means of communication.

Electromagnetic Interference (EMI) is an important aspect of performance of any electronic device. Any device to be sold commercially requires adherence to regulation in different countries or regions in terms of radiated power from it. Any power supply (wired or wireless) that includes high frequency switching can produce both conducted and radiated electromagnetic interference (EMI) at levels that exceed the acceptable limits so care should be taken to keep such emissions to a minimum.

For an inductive charger comprising a number of coils and electronics switches and control circuitry, the main sources of emission include:

Any potential radiated noise from switching FETS, drivers, or sense and control circuitry. This noise can be at higher frequency than the fundamental drive frequency of the coils and can be emitted away from the charger because of the frequency. This noise can be minimized by optimizing the drive circuit to avoid sharp edges in the drive waveform and associated noise.

Noise from copper traces with AC signals. This noise can also be at higher frequency and emit away from the charger. The length of these paths should be minimized.

Electromagnetic emission from the switched coil. For coils described here and driven in the 100's of kHz up to several MHz, the wavelength of the Electromagnetic (EM) field generated can be in the hundreds of meters. Given the small length of the coils' windings (often 1 m or less), the coils used are not efficient far-field transmitters of the EM field and the generated EM field is in general highly contained near the coil surface. The magnetic flux pattern from a PCB coil is highly contained in the area of a coil and does not emit efficiently away from the coil.

Care should be taken when designing the current paths, and in some embodiments shielding of the FETs or other ICs or electronics components may be necessary. In addition, switching the coils with waveforms that have higher frequency components, gives rise to noise at higher frequencies. In any of the above geometries described, incorporation of conductive layers and/or ferromagnetic layers in the system can shield the outside environment from any potential radiative fields. The conductive layers can be incorporated in the PCB to eliminate the need for additional separate shielding layers.

In any of the configurations described here, care should be taken when designing the current paths, and in some embodiments shielding of the FETs or other ICs or electronics components may be necessary.

In accordance with an embodiment, the shielding can be implemented by incorporation of ferrite or metal sheets or components or a combination thereof. Use of thin layers (typically several micrometers of less in thickness) of metal or other conductive paint, polymer, nano material, dielectric or alike that take advantage of frequency dependence of the skin effect to provide a frequency dependent shielding or attenuation have been described in other patent applications (e.g., U.S. Patent Publication No. 20090096413, which application is herein incorporated by reference) where a process for incorporating a thin layer of metal in the top and/or bottom layer or other areas of the charger have been described. Since the layer does not absorb incident EM fields at the frequency of operation of the device, they would pass through even on the top surface of the charger (facing the charger coil or on the top surface) but higher frequency components would be absorbed reducing or eliminating the harmful effect of higher frequency components radiation to nearby devices, interference, or effects on living organisms or humans and meeting regulatory conditions for operation. It is therefore possible to incorporate the charger or receiver into parts or products where the charger and/or receiver coil is covered by a thin layer of conductive or conductive containing material or layer. Such conductive material can include metallic, magnetic, plastic electronic or other material or layers.

In many situations, the frequency content of any EMI emissions from the wireless charger and receiver is important, and care should be taken that the fundamental frequency and its harmonics do not exceed required values and do not cause unnecessary interference with other electronic devices, vehicles or components nearby.

In accordance with an embodiment, one method that can be used to reduce the peak value of such emissions is to intentionally introduce a controlled dither (variation) to the frequency of the operation of the charger. Such a dither would reduce the peak and spread the frequency content of the fundamental emission and its harmonic over a range of frequencies determined by the amount of the dither or shift introduced. Appropriate implementation of dither can reduce undesired interference issues at a given frequency to acceptable levels. However, the overall emitted power may not be reduced. To introduce a dither in any of the systems described here, the charger driver can be appropriately driven by the MCU to dither its operating frequency or this can be hard wired into the design. Introduction of dither would typically introduce a slow ripple to the output voltage from the receiver. However, this slow ripple can be kept to a minimum or a regulator or circuit can be incorporated into the receiver to reduce this ripple to an acceptable level or to eliminate it.

In accordance with an embodiment, the multi-protocol approaches described here are useful for development of a universal system that can operate amongst multiple systems and provide user convenience.

In accordance with an embodiment, the systems described here can use discreet electronics components or some or all of the functions, circuits or ICs described above can be integrated into an Application Specific Integrated Circuit (ASIC) or a Multi-Chip Module (MCM) packaging to achieve smaller footprint, better performance/noise, and/or cost advantages. Such integration is common in the Electronics industry and can provide additional advantages here.

In many cases, for the systems described above, the transmitter and receiver coils can be of similar, although not necessarily same sizes and are generally aligned laterally to be able to transfer power efficiently. For coils of similar size, this would typically require the user to place the device and/or receiver close to alignment with respect to the transmitter coil. For example, for a transmitter/receiver coil of 30 mm diameter, this would require lateral (x,y) positioning within less than 30 mm so there is some degree of overlap between the coils. In practice, a considerable degree of overlap is necessary to achieve high output powers and efficiencies. This can be achieved by providing mechanical or other mechanisms such as indentations, protrusions, walls, holders, fasteners, to align the parts.

In accordance with an embodiment, for a universal charger/power supply to be useful for charging or powering a range of devices, a design able to accept any device and receiver is desirable. For this reason, in accordance with an embodiment, a flat or somewhat curved charger/power supply surface that can be used with any type of receiver can be used. To achieve alignment in this case, markings, small protrusions or indentations and/or audio and/or visual aids or similar methods can be used. Other methods include use of magnets, or magnet(s) and magnetic or ferrite magnetic attractor material(s) that can be attracted to a magnet in the transmitter/charger and receiver. In these methods, typically a single charger/transmitter and receiver are in close proximity and aligned to each other.

However, for even greater ease of use, it is desirable to be able to place the device to be charged/powered over a larger area, without requiring precise alignment of coils.

Several methods that address the topic of position independence have been described previously. For example, as described in U.S. Patent Publication No. 20070182367 and U.S. Patent Publication No. 20090096413, both of which applications are herein incorporated by reference, an embodiment comprising multiple transmitter coils arranged in a two-dimensional array to cover and fill the transmitter surface is described. When a receiver is placed on the surface of such a coil array, the transmitter coil with the largest degree of overlap with the receiver is detected and activated to allow optimum power transmission and position independent operation. The detection can be provided through, e.g. detection of weight, capacitive, optical, mechanical, magnetic RFID, RF, or electrical sensing of the receiver.

In accordance with an embodiment, the coils in the charger/power supply are sequentially powered (pinged) and the charger/power supply waits for any potentially nearby receivers to be powered up and to reply to the ping. If no reply is detected back within a time window, the next coil is activated, until a reply is detected in which case the charger/power supply initiates power up of the appropriate transmitter coil(s) and proceeds to charge/power the receiver.

In another geometry, each transmitter (or charger) coil center includes a sensor inductor (e.g., as described by E. Waffenschmidt, and Toine Staring, 13th European Conference on Power Electronics and Applications, Barcelona, 2009. EPE '09. pp. 1-10). The receiver coil includes a soft magnetic shield material that shifts the resonance frequency response of the system and can be sensed by a sensor in the transmitter to switch the appropriate coil on. The drawback of this system is that three layers of overlapping coils with a sensor and detection circuit at the center of each is required, adding to the complexity and cost of the system. Other variations of the above or a combination of techniques can be used to detect the appropriate transmitter coil.

In accordance with other embodiments, such as those described in U.S. Patent Publication No. 20070182367 and U.S. Patent Publication No. 20090096413, the charger or power supply can contain one or more transmitter coils that are suspended and free to move laterally in the x-y plane behind the top surface of the charger/power supply. When a receiver coil is placed on the charger/power supply, the closest transmitter coil would move laterally to position itself to be under and aligned with the receiver coil.

One passive method of achieving this can be to use magnets or a combination of magnet(s) and attractor(s) (one or more attached to the transmitter coil or the movable charging component and one or more to the receiver coil or receiver) that would attract and passively align the two coils appropriately.

In accordance with another embodiment, a system that detects the position of the receiver coil on the charger/power supply surface and uses this information to move the transmitter coil to the appropriate location actively using motors, piezo or other actuators, is possible.

In general, the systems described above generally use coils that are of similar size/shape and in relatively close proximity to create a wireless power system. However, in accordance with various embodiments, dissimilar size coils can be used.

As described above, the coupling coefficient k is an important factor in design of the wireless power system. In general, wireless power systems can be categorized into two types. One category which is called tightly-coupled operates in a parameter space where the k value is typically 0.5 or larger. This type of system is characterized by coils that are typically similar in size and/or spatially close together in distance (z axis) and with good lateral (x,y) overlap. This so called tightly-coupled system is typically associated with high coil power transfer efficiencies defined here as the ratio of output power from the receiver coil to input power to transmitter coil. The methods described above for position independent operation (array of transmitter coils and moving coils), typically may use tightly-coupled coils.

In contrast, for coils of dissimilar size or design or larger transmitter to receiver distance or smaller lateral coil overlap, the system coupling coefficient is lower. Another important parameter, the quality factor of a transmitter (tx) and receiver (rx) coil is defined as:

$$Q_{tx} = 2\pi f L_{tx}/R_{tx}$$
$$Q_{rx} = 2\pi f L_{rx}/R_{rx}$$

where f is the frequency of operation, $L_{tx}$, and $L_{rx}$ the inductances of the transmitter and receiver coils and $R_{tx}$ and $R_{rx}$ their respective resistances. The system quality factor can be calculated as follows:

$$Q = (Q_{tx} \times Q_{rx})^{1/2}$$

In general, the loosely-coupled systems may have smaller power transfer efficiencies.

However, it can be shown (e.g., E. Waffenschmidt, referenced above) that an increase of Q can compensate for smaller k values, and reasonable or similar power transfer efficiencies can be obtained. Such systems with dissimilar coil sizes and higher Q values are sometimes referred to as Resonant Coupled or Resonant systems. However, resonance is also often used in the case of similar-size coil systems.

Others, (such as Andre Kurs, Aristeidis Karalis, Robert Moffatt, J. D. Joannopoulos, Peter Fisher, and Marin Soljac, Science, 317, P. 83-86, 2007) have shown that with systems with k of <0.2 due to large distance between coils (up to 225 cm), sizeable reported power transfer efficiencies of 40%-70% can be obtained. Other types of loosely-coupled system appear to use mis-matched coils where the transmitter coil is much larger than the receiver coil (e.g., J. J. Casanova, Z. N. Low, J. Lin, and Ryan Tseng, in Proceedings of Radio Wireless Symposium, 2009, pp. 530-533 and J. J. Casanova, Z. N. Low, and J. Lin, IEEE Transactions on Circuits and Systems—11: Express Briefs, Vol. 56, No. 11, November 2009, pp. 830-834)

Some references (e.g., U.S. Pat. Nos. 6,906,495, 7,239, 110, 7,248,017, and 7,042,196) describe a loosely-coupled system for charging multiple devices whereby a magnetic field parallel to the plane of the charger is used. In these instances, the receiver contains a coil that is typically wrapped around a magnetic material such as a rectangular thin sheet and has an axis parallel to the plane of the charger. To allow the charger to operate with the receiver rotated to any angle, two sets of coils creating magnetic fields parallel to the plane of the charger at 90 degrees to each other and driven out of phase are used.

Such systems may have a larger transmitter coil and a smaller receiver coil and operate with a small k value (possibly between 0 and 0.5 depending on coil size mismatch and gap between coils/offset of coils). Of course, the opposite case of a small transmitter coil and larger receiver coil is also possible.

Figure 11:
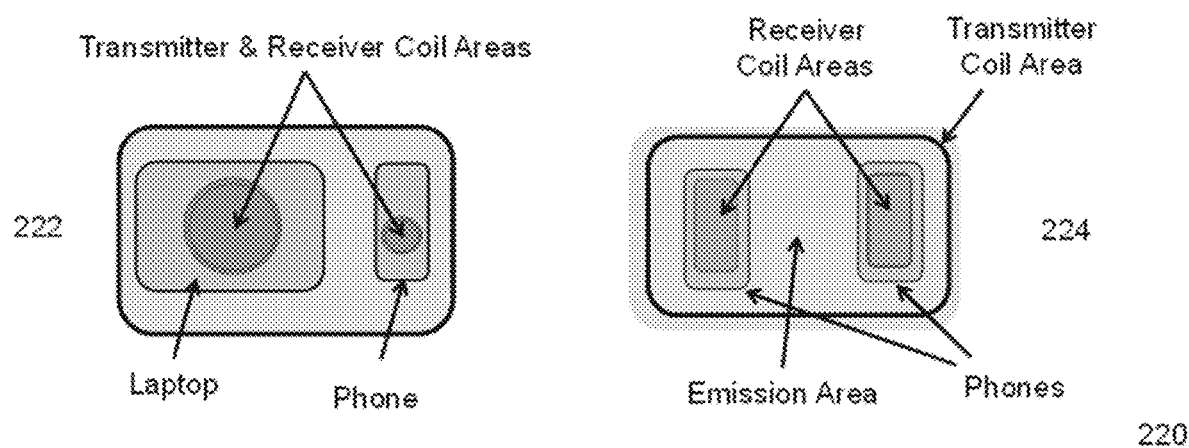
FIG. 11 illustrates on the left configurations of a tightly-coupled power transfer system with two individual transmitter coils of different size, and on the right configurations of a loosely-coupled (magnetic resonance) power transfer system with a single individual transmitter coil, in accordance with an embodiment.

FIG. 11 shows configurations 220 for a tightly-coupled power transfer system with two individual transmitter coils of different size powering a laptop and a phone (left, 222) and a loosely-coupled wireless power system with a large transmitter coil powering two smaller receiver coils in mobile phones (right, 224), in accordance with an embodiment.

An ideal system with largely mis-matched (i.e., dissimilar in size/shape) coils can potentially have several advantages:

Power can be transferred to the receiver coil placed anywhere on the transmitter coil.

Several receivers can be placed and powered on one transmitter allowing for simpler and lower cost of transmitter.

The system with higher Q can be designed so the gap between the transmitter and receiver coil can be larger than a tightly-coupled system leading to design of systems with more design freedom. In practice, power transfer in distances of several cm or even higher have been demonstrated.

Power can be transferred to multiple receivers simultaneously. In addition, the receivers can potentially be of differing power rating or be in different stages of charging or require different power levels and/or voltages.

In order to achieve the above characteristics and to achieve high power transfer efficiency, the lower k value is compensated by using a higher Q through design of, e.g., lower resistance coils. The power transfer characteristics of these systems may differ from tightly-coupled systems and other power drive geometries such as class E amplifier or Zero Voltage Switching (ZVS) or Zero Current Switching (ZCS) or other power transfer systems may operate more efficiently in these situations. In addition, impedance matching circuits at the charger/transmitter and/or receiver may be required to enable these systems to provide power over a range of load values and output current conditions. General operation of the systems can, however be quite similar to the tightly-coupled systems and one or more capacitors in series or parallel with the transmitter and/or receiver coil is used to create a tuned circuit that may have a resonance for power transfer. Operating near this resonance point, efficient power transfer across from the transmitter to the receiver coil can be achieved. Depending on the size difference between the coils and operating points, efficiencies of over 50% up to near 80% have been reported.

To provide more uniform power transfer across a coil, methods to provide a more uniform magnetic field across a coil can be used. One method for achieving this uses a hybrid coil comprising a combination of a wire and PCB coils (e.g., X. Liu and S. Y. R. Hui, "Optimal design of a hybrid winding structure for planar contactless battery charging platform," IEEE Transactions on Power Electronics, vol. 23, no. 1, pp. 455-463, 2008). In another method, the transmitter coil is constructed of Litz wire and has a pattern that is very wide between successive turns at the center and is more tightly wound as one gets closer to the edges (e.g., J. J. Casanova, Z. N. Low, J. Lin, and R. Tseng, "Transmitting coil achieving uniform magnetic field distribution for planar wireless power transfer system," in Proceedings of the IEEE Radio and Wireless Symposium, pp. 530-533, January 2009).

Figure 12:
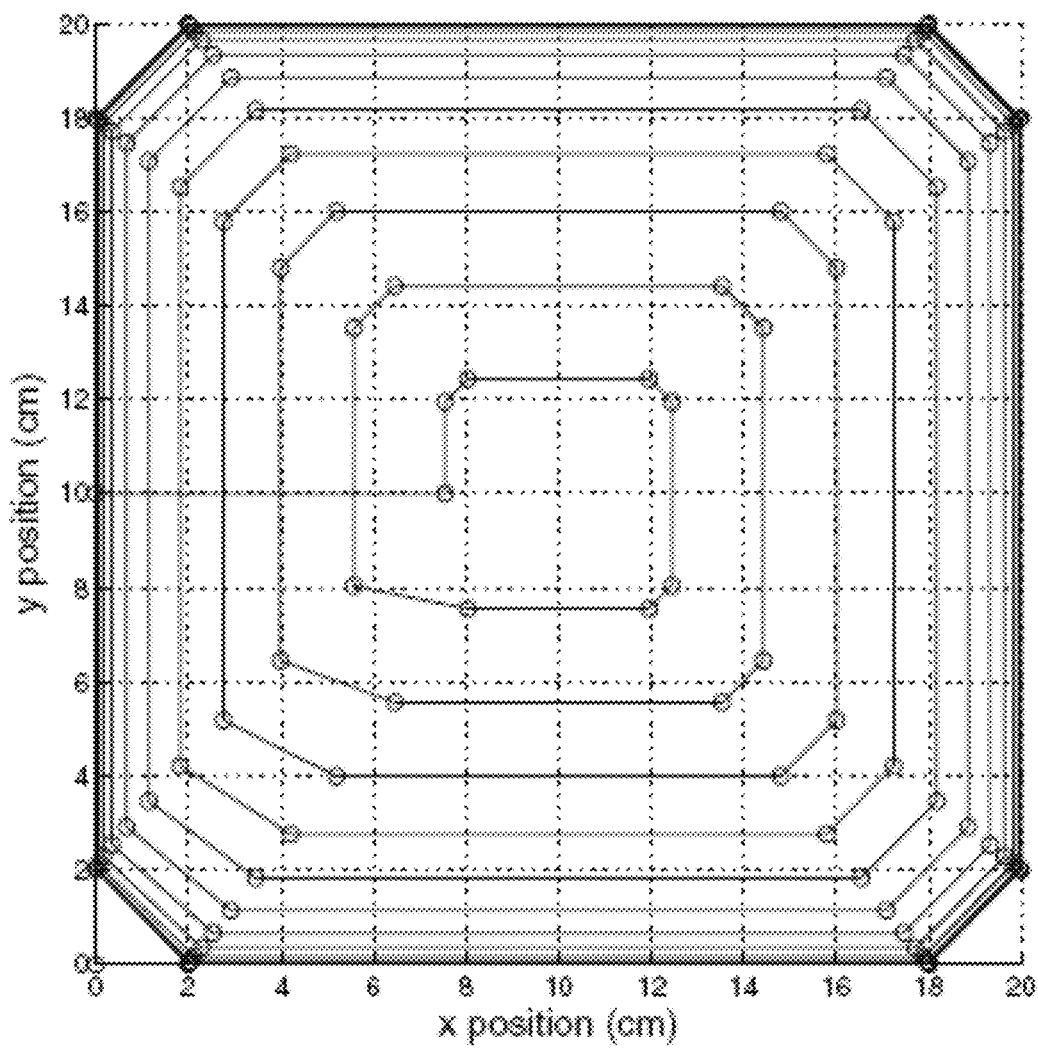
FIG. 12 illustrates an example coil.
Figure 13:
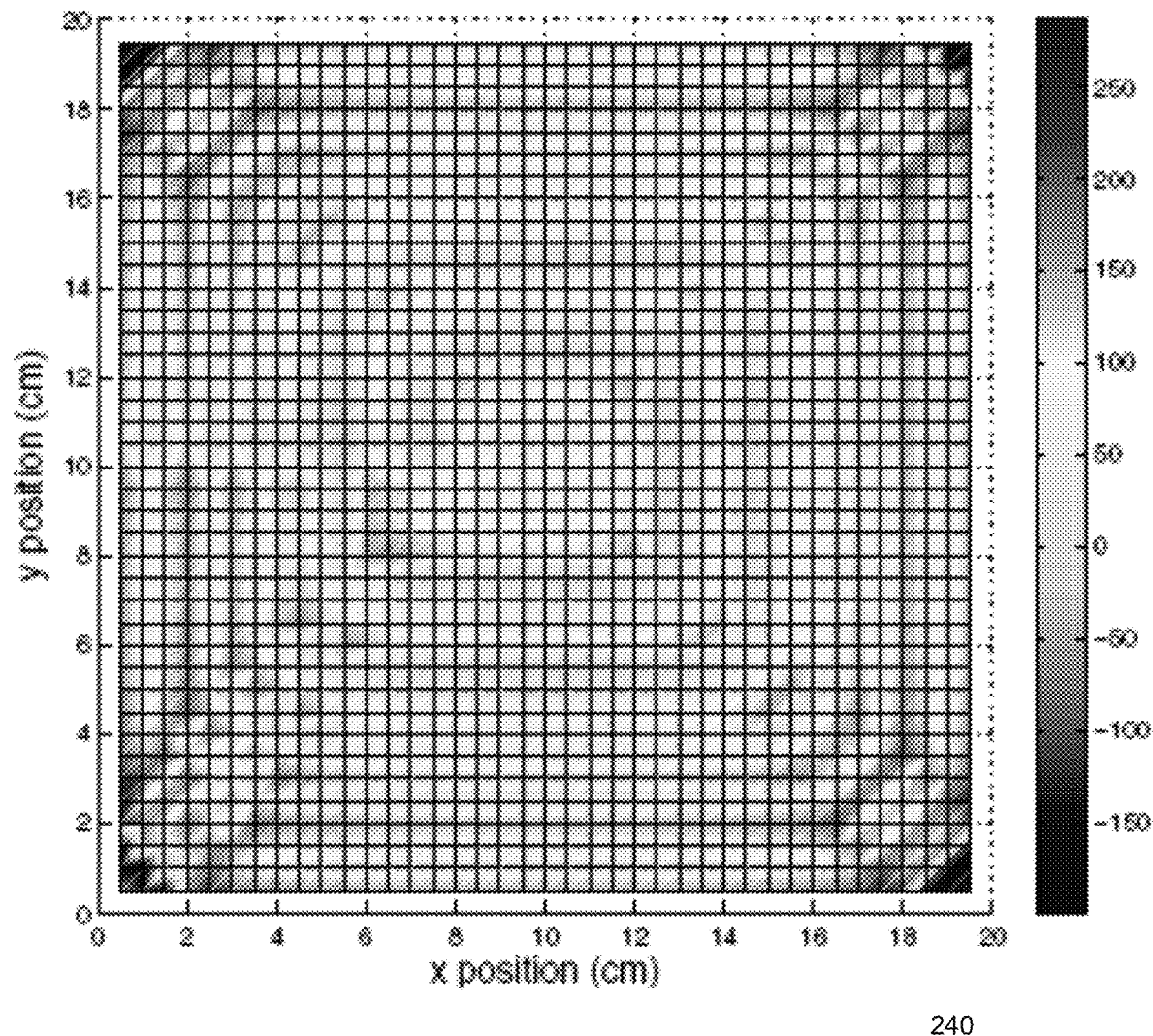
FIG. 13 illustrates a resulting calculated magnetic field for the coil of FIG. 12.

FIG. 12 shows a coil 230 demonstrated therein, while FIG. 13 shows the resulting calculated magnetic field 240.

In a geometry described in U.S. Patent Publication No. 20080067874, a planar spiral inductor coil is demonstrated, wherein the width of the inductor's trace becomes wider as the trace spirals toward the center of the coil to achieve a more uniform magnetic field allowing more positioning flexibility for a receiver across a transmitter surface. In yet other embodiments (F. Sato, et al., IEEE Digest of Intermag 1999, PP. GR09, 1999), the coil can be a meandering type of coil wherein the wire is stretched along X or Y direction and then folds back and makes a back-and-forth pattern to cover the surface.

In accordance with an embodiment, the charger can operate continuously, and any appropriate receiver coil placed on or near its surface will bring it to resonance and will begin receiving power. The regulation of power to the output can be performed through a regulation stage and/or tuning of the resonant circuit at the receiver. Advantages of such a system include that multiple receivers with different power needs can be simultaneously powered in this way. The receivers can also have different output voltage characteristics.

To achieve this, in accordance with an embodiment, the number of turns on the receiver coil can be changed to achieve different receiver output voltages. Without any receivers nearby, such a charger would not be in resonance and would draw minimal power. Once one or more receivers are placed on the charger, the system resonance is shifted and power transfer would initiate. In accordance with an embodiment, at end of charge, the receiver can also include a switch that will detect the minimal current draw by a device connected to the receiver, and disconnect the output altogether and/or disconnect the receiver coil so that the receiver is no longer drawing power. This would bring the charger out of resonance and minimal input current would be drawn at this stage.

In accordance with another embodiment, the charger can periodically ping for receivers, and initiate and maintain power transfer if sufficient current draw from a receiver is detected. Otherwise, the charger can return to standby and continue pinging. Such a system would have even lower stand-by power usage.

In a more complex system, similar communication and control and/or receiver detection as described for the tightly-coupled situation earlier can be applied for such loosely-coupled systems. However, a wireless power system designed to power multiple receivers placed on a single transmitter may need to regulate the power transfer and the voltage at each receiver differently depending on the status of the load/device to which the power is being delivered.

In accordance with another embodiment, in instances where multiple receivers are placed on one transmitter coil and it is desired to power/charge all devices, all of the receivers may try to communicate with the transmitter, and the transmitter should distinguish between receivers and operate differently (e.g., at different power level, or switching frequency) with each one. Since the transmitter coil emits power to all the receivers, it may be difficult to regulate power delivered to each receiver differently. Therefore, in a practical system, some degree of regulation of power to be delivered to a load or device can be performed in the receiver circuitry.

In another method of regulation, each receiver can time-share the transmitter power. Each receiver placed on a transmitter can synchronize and communicate with the transmitter and/or with other receivers through wireless RF communication or RFID or Near Field Communication, Bluetooth, WiFi, Zigbee, wireless USB or other protocols or communication through power transfer and/or separate coils or through optical or other methods. The transmitter can then power each receiver sequentially and deliver the appropriate power level through adjustment of the transmitter frequency, pulse width modulation, or adjustment of input voltage, or a combination of above methods. In order for this system to operate, it may be necessary for all or some of the receivers to disconnect from receipt of power during the time period when one receiver is receiving power. This can be accomplished by implementing and opening a switch in the path of the receiver coil circuit or disabling the receiver's output or its associated optional regulator or alike. In this way, only one receiver coil (or more depending on design and architecture) is at any given time magnetically coupled to the transmitter and receives power. After some period of time, that receiver may be disconnected by opening its appropriate switch and the next receiver powered. Alternatively, one or more receivers can be powered at the same time. In this case, the receivers may need to share the available power so, for example, while with one receiver 5 W of output power may be available, with 2 receivers, each can only output only 2.5 W. This may be acceptable in many charging and/or power applications.

In any practical system, in addition to the power transfer and communication system, appropriate electromagnetic shielding of the transmitter and receiver is necessary and may be similar or different to the tightly-coupled systems.

The ratio of the size of the transmitter coil to the receiver coil can be decided depending on design considerations such as the desired number of receivers to be powered/charged at any given time, the degree of positioning freedom needed or the physical size of device being charged/powered. In the case that the transmitter coil is designed to be of a size to accommodate one receiver at a time, the transmitter and receiver coils can be of similar size thereby bringing the loosely-coupled system to the tightly-coupled limit in this case.

While the loosely-coupled system may have distinct advantages and in some ways may overcome the complexities of the multiple coil/moving coil systems employed in tightly-coupled systems to achieve position independence, traditional systems suffer from several issues, for example:

Since a large area transmitter coil and smaller receiver coil may be used, Electromagnetic emission in areas of the transmitter coil not covered by the receiver coil is present. This emission is in the near field and drops rapidly away from the coil. Nevertheless, it can have adverse effects on devices and/or people in the vicinity of the transmitter.

The receiver may be incorporated or attached to electronic and electrical devices or batteries that often contain metallic components and/or circuits and/or parts/shells. Such metallic sections that are not shielded may absorb the emitted electromagnetic (EM) field from the transmitter and create destructive and undesirable eddy currents and/or heating in these parts.

The electromagnetic field emitted may also affect the operation of the device being powered or charged or even nearby devices that are not on the transmitter/charger. Such interference with device operation/reception or a drop in sensitivity of a radio transmitter/receiver (desense) is quite important in design of mobile or electronic devices such as mobile phones or communication devices. To avoid this effect, the portions of the device being charged or powered that may be exposed to the EM field with the exception of the receiver coil area may need to be shielded causing severe restrictions on the device design and affecting operation of other antennas or wireless components in the device.

In many situations, an after-market or optional receiver such as a case, skin, carrier, battery or attachment with a receiver built in is desired to enable a mobile or electronic/electric device to be powered or charged wirelessly. To shield the entire device from EM radiation at locations beside the receiver coil, such an after-market or optional receiver will require shielding in all other locations of the device thereby severely limiting the design and choices in after-market products possible. For example, a battery with a built-in receiver circuit and shielding may not be sufficient to protect a mobile device to be charged wirelessly. For example, in the case of a mobile phone, such a battery would cover only a small area of a mobile phone's back's surface area leaving the rest of the phone exposed to EM radiation which could have serious effects on its performance and operation. Furthermore, the shielding may affect the performance of the device and its multiple wireless components.

Metallic objects such as keys or coins or electronic devices or cameras that contain metal backs or circuits containing metals or other metal that are placed on a charger/transmitter may affect the operation of the transmitter and draw power from it due to eddy currents. This may result in excessive heating of such objects that is highly undesirable.

The EM field emitted from the transmitter further may be sufficiently physically close to a user as to be affecting and incident on the user. Such exposure to EM radiation may result in unwanted or unacceptable levels of exposure.

Many regulatory guidelines regarding the safe exposure limits for human and electrical/electronic device operation exists and awareness and concern regarding this issue is increasing. Any unnecessary exposure from an uncovered and operating area of a transmitter is highly undesirable.

A substantial amount of power from the transmitter may be lost from the area that is not physically covered by the receiver leading to lower efficiencies and wastage of power.

To capture the most amount of power and to achieve higher efficiencies, the receiver coil area should be maximized. This often leads to a larger receiver coil area than tightly-coupled implementations.

It is therefore desired to benefit from the advantages of a loosely-coupled system while minimizing or avoiding problems related to it.

In accordance with embodiments described previously in U.S. Patent Publication No. 20120235636, embodiments are described therein whereby through appropriate design of the system, and use of two techniques referred to therein as Magnetic Aperture (MA) and Magnetic Coupling (MC) respectively, the benefits of the use of a mismatched (in size) coil system can be retained, while overcoming the problems and issues raised above, leading to ideal systems for wireless power transfer.

As described above, a position independent system can be implemented by use of a large area transmitter coil upon which a smaller receiver coil can be placed on a variety or any location and receive power.

Figure 14:
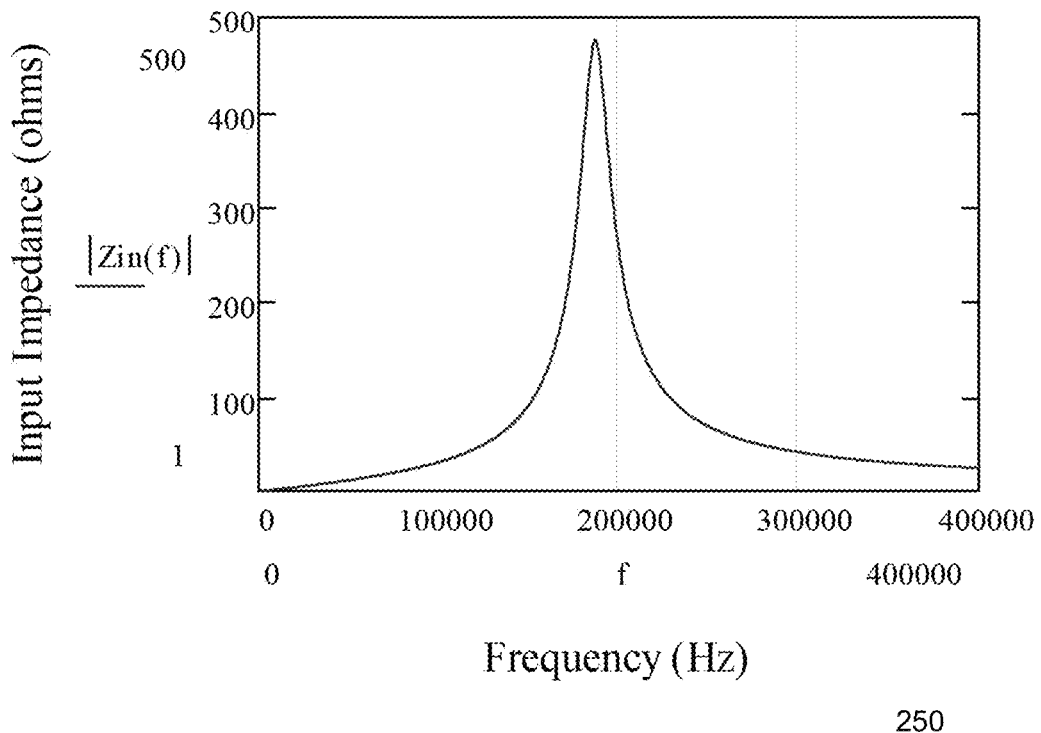
FIG. 14 illustrates the impedance to the input supply of a transmitter, showing the resonance in power transfer.

Typically, a system such as shown in FIG. 2 includes capacitors in series and/or parallel with the transmitter and/or receiver coils to provide a resonant circuit that shows strong power transfer characteristics at particular frequencies. (e.g., S. Y. Hui, H. S. H Chung, and S. C. Tang, IEEE Transactions on Power Electronics, Vol. 14, pp. 422-430 (1999), which shows an analysis method for such a system). Using values of $L1=46$ µH for the transmitter coil and $L2=4$ µH for the receiver (based on a 16 cm×18 cm 13-turn transmitter coil and a 4 cm×5 cm, 6-turn receiver coil (J. Casanova, Z. N. Low, and J. Lin, IEEE Trans. On Circuits and Systems—II, Express Briefs, Vol. 56, pp. 830-834 (2009)), and using 12 nF for the receiver capacitance, the impedance to the input supply of the transmitter can be calculated as shown in FIG. 14, showing the resonance in power transfer 250.

In practice, a transmitter operating on or near resonance frequency does not draw much power until a receiver of appropriate inductance and capacitance is nearby thereby shifting its operating point and bringing it into resonance at which point, significant power can be drawn from the transmitter supply and enabling large power transfer and high power transfer efficiencies. However, as described above, a large area transmitter typically would also then emit power into areas not covered by the receiver coil, which could cause EMI and accompanying health issues.

In accordance with embodiments described previously in U.S. Patent Publication No. 20120235636, the techniques described therein allow operation of a position-independent power transfer system, while reducing or eliminating undesirable radiation from other areas of the transmitter coil.

In accordance with one embodiment described earlier, a large transmitter coil and smaller receiver coil or coils similar to a loosely-coupled system are used. However, to reduce or eliminate radiation from the transmitter coil, the transmitter coil is covered with a thin soft magnetic layer.

Figure 15:
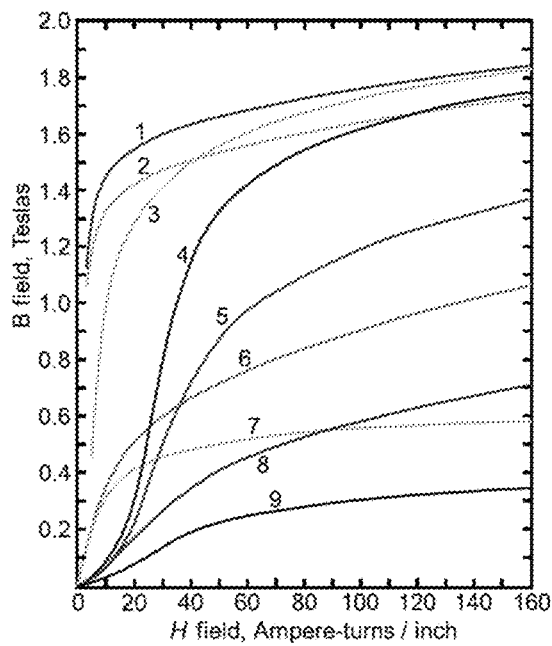
FIG. 15 illustrates magnetization curves of a number of Ferromagnetic materials.

FIG. 15 illustrates magnetization curves 260 of a number of Ferromagnetic materials. They include 1. Sheet steel, 2 Silicon steel, 3 Cast steel, 4 Tungsten steel, 5 Magnet steel, 6 Cast iron, 7 Nickel, 8 Cobalt, and 9 Magnetite. In the linear regime of operation, the magnetic field strength H is related to the magnetic flux density B through the permeability of the material p:

$$B = \mu H + M$$

where M is the magnetization of a material. Each of B, H, and M are vectors, and p is a scalar in isotropic materials and a tensor in anisotropic ones. In anisotropic materials, it is therefore possible to affect the magnetic flux in one direction with a magnetic field applied in another direction. The permeability of Ferromagnetic materials is the slope of the curves shown in FIG. 15 and is not constant, but depends on H. In Ferromagnetic or Ferrite materials as shown in FIG. 15, the permeability increases with H to a maximum, then as it approaches saturation it decreases by orders of magnitude toward one, the value of permeability in vacuum or air. Briefly, the mechanism for this nonlinearity or saturation is as follows: for a magnetic material including domains, with increasing external magnetic field, the domains align with the direction of the field (for an isotropic material) and create a large magnetic flux density proportional to the permeability times the external magnetic field. As these domains continue to align, beyond a certain value of magnetic field, the domains are all practically aligned and no further increase in alignment is possible reducing the permeability of the material by orders of magnitude closer to values in vacuum or air.

Different materials have different saturation levels. For example, high permeability iron alloys used in transformers reach magnetic saturation at 1.6-2.2 Tesla (T), whereas ferromagnets saturate at 0.2-0.5 T. One of the Metglass amorphous alloys saturates at 1.25 T. The magnetic field (H) required to reach saturation can vary from 100 A/m or lower to 1000's of A/m. Many materials that are typically used in transformer cores include materials described above, soft iron, Silicon steel, laminated materials (to reduce eddy currents), Silicon alloyed materials, Carbonyl iron, Ferrites, Vitreous metals, alloys of Ni, Mn, Zn, Fe, Co, Gd, and Dy, nano materials, and many other materials in solid or flexible polymer or other matrix that are used in transformers, shielding, or power transfer applications. Some of these materials may be appropriate for applications in various embodiments described herein.

Figure 16:
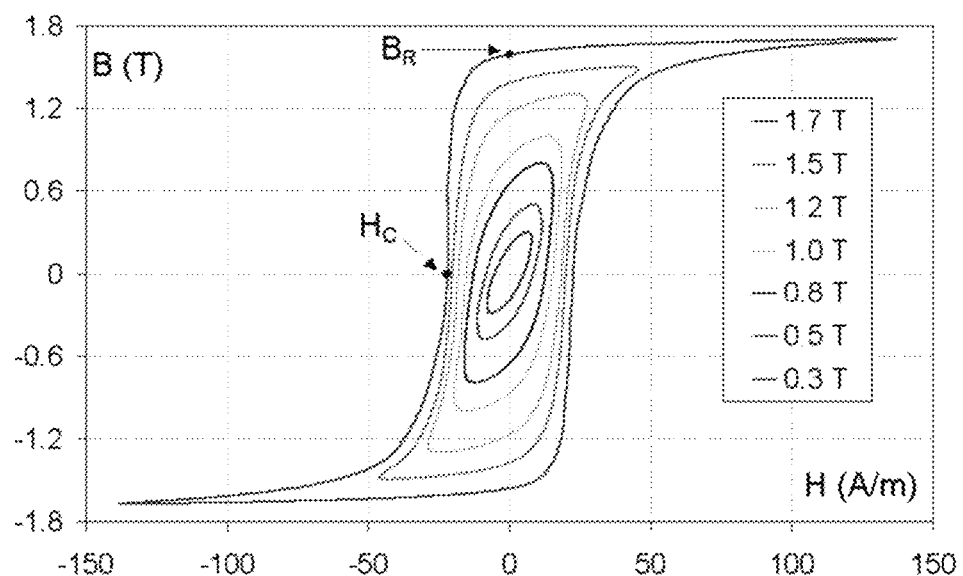
FIG. 16 illustrates a hysteresis curve for a hard ferromagnetic material such as steel.

FIG. 16 illustrates a hysteresis curve 270 for a hard ferromagnetic material such as steel. As the magnetic field is increased, the magnetic flux saturates at some point, therefore no longer following the linear relation above. If the field is then reduced and removed, in some media, some value of B called the remanence (Br) remains, giving rise to a magnetized behavior. By applying an opposite field, the curve can be followed to a region where B is reduced to zero. The level of H at this point is called the coercivity of the material.

Figure 17:
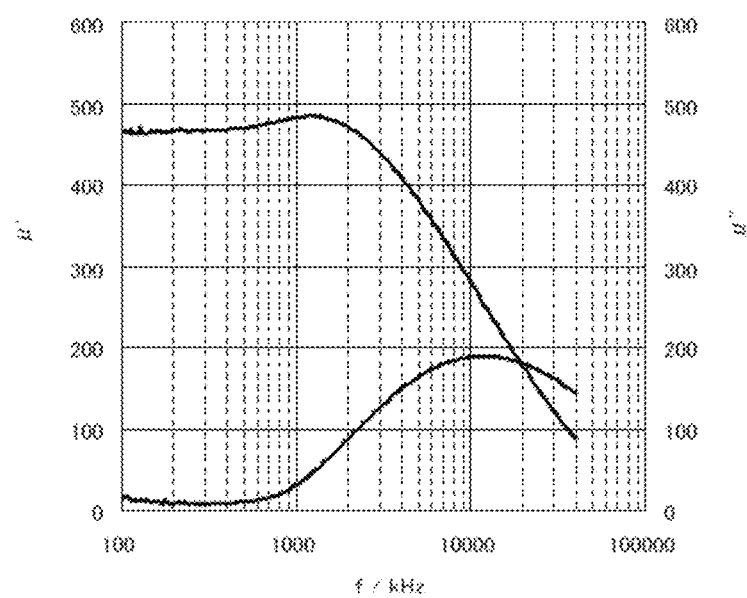
FIG. 17 illustrates real and imaginary parts of the permeability of a ferromagnetic material layer.

Many magnetic shield layers comprise a soft magnetic material made of high permeability ferromagnets or metal alloys such as large crystalline grain structure Permalloy and Mu-metal, or with nanocrystalline grain structure Ferromagnetic metal coatings. These materials do not block the magnetic field, as with electric shielding, but instead draw the field into themselves, providing a path for the magnetic field lines around the shielded volume. The effectiveness of this type of shielding decreases with the decrease of material's permeability, which generally drops off at both very low magnetic field strengths, and also at high field strengths where the material becomes saturated as described above. The permeability of a material is in general a complex number:

$$\mu = \mu' + j\mu''$$

where $\mu'$ and $\mu''$ are the real and imaginary parts of the permeability providing the storage and loss component of the permeability respectively. FIG. 17 illustrates the magnetic field frequency dependence of the real and imaginary part of the permeability of a ferromagnetic material layer 280.

Figure 18:
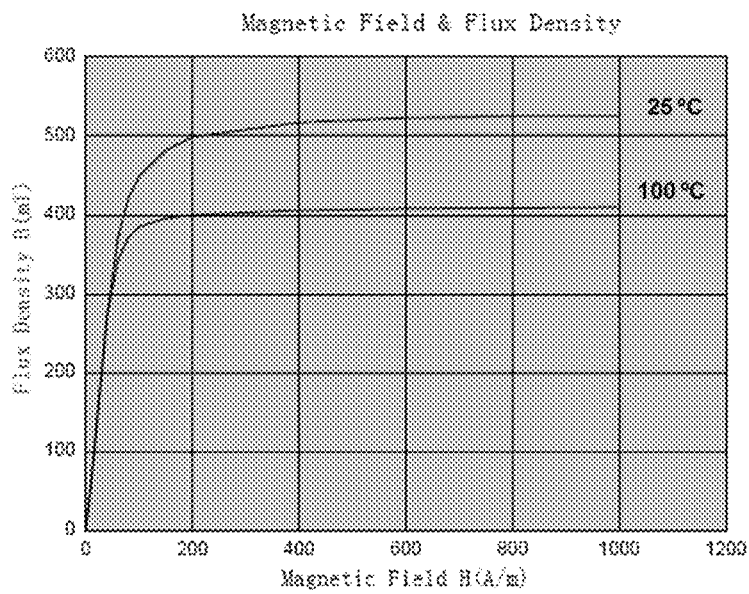
FIG. 18 illustrates the magnetization curves of a high permeability proprietary soft magnetic ferrite material

FIG. 18 illustrates the magnetization curves 290 of a high permeability (real permeability about 3300) proprietary soft magnetic ferrite material at 25° C. and 100° C. temperature. Increase of temperature results in a reduction in the Saturation Flux density. But at either temperature, saturation of the flux density B with increasing H is clearly observed. A distinct reduction in the slope of B-H curve (i.e. material permeability) is observed at around 100 A/m and the reduction of the permeability increases with H increase until the material permeability approaches 1 at several hundred A/m. This particular material is MnZn based and retains high permeability at up to 1 MHz of applied field frequency but loses its permeability at higher frequencies. Materials for operation at other frequency ranges also exist. In general, MnZn based materials can be used at lower frequency range while NiZn based materials are used more at higher frequencies up to several hundred MHz.

In accordance with an embodiment, it is possible with appropriate material engineering and composition to optimize material parameters to obtain the desired real and imaginary permeabilities at any operating frequency and to also achieve the saturation magnetic field and behavior desired.

Magnetic Coupling (MC) Geometry

In accordance with embodiments described in U.S. Patent Publication No. 20120235636, a method is described therein for providing shielding/reducing the EM field emitted from the transmitter coil, while at the same time providing a path for transfer of power from this field to a receiver coil placed arbitrarily on the surface of the transmitter.

Figure 19:
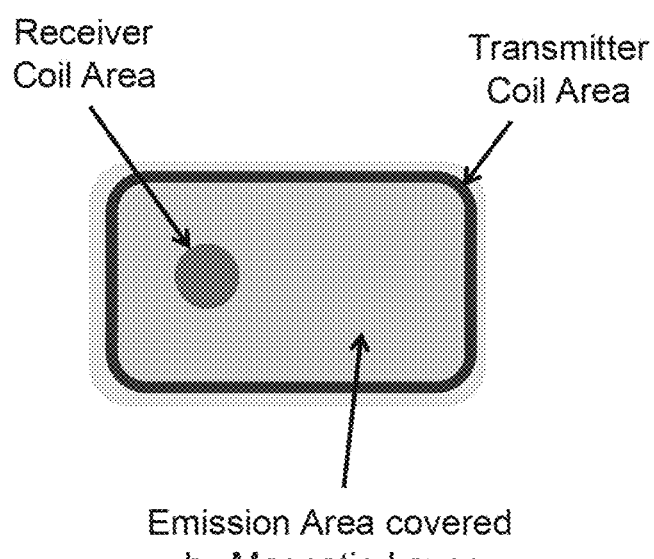
FIG. 19 illustrates a large area transmitter coil covered by a ferromagnetic, ferrite, or other magnetic material or layer, in accordance with an embodiment and a representative receiver coil.

To achieve this, in accordance with an embodiment illustrated in FIG. 19, a large area transmitter coil (of wire, Litz wire, or PCB type, or a combination thereof) is covered by a ferromagnetic, ferrite, or other magnetic material or layer that acts to guide, confine, and shield any field, due to its high permeability. Choosing the thickness of the material and its permeability and saturation properties, the magnetic material can reduce or shield the field in the area above the charger/transmitter coil so that it is reduced by 2 orders of magnitude or less compared to an otherwise similar geometry without the magnetic layer. Bringing a receiver coil with appropriate resonant capacitor in series or parallel to the receiver coil, the field penetrating the magnetic layer can be collected, and localized power transfer wherever the receiver coil is placed can be achieved.

Figure 20:
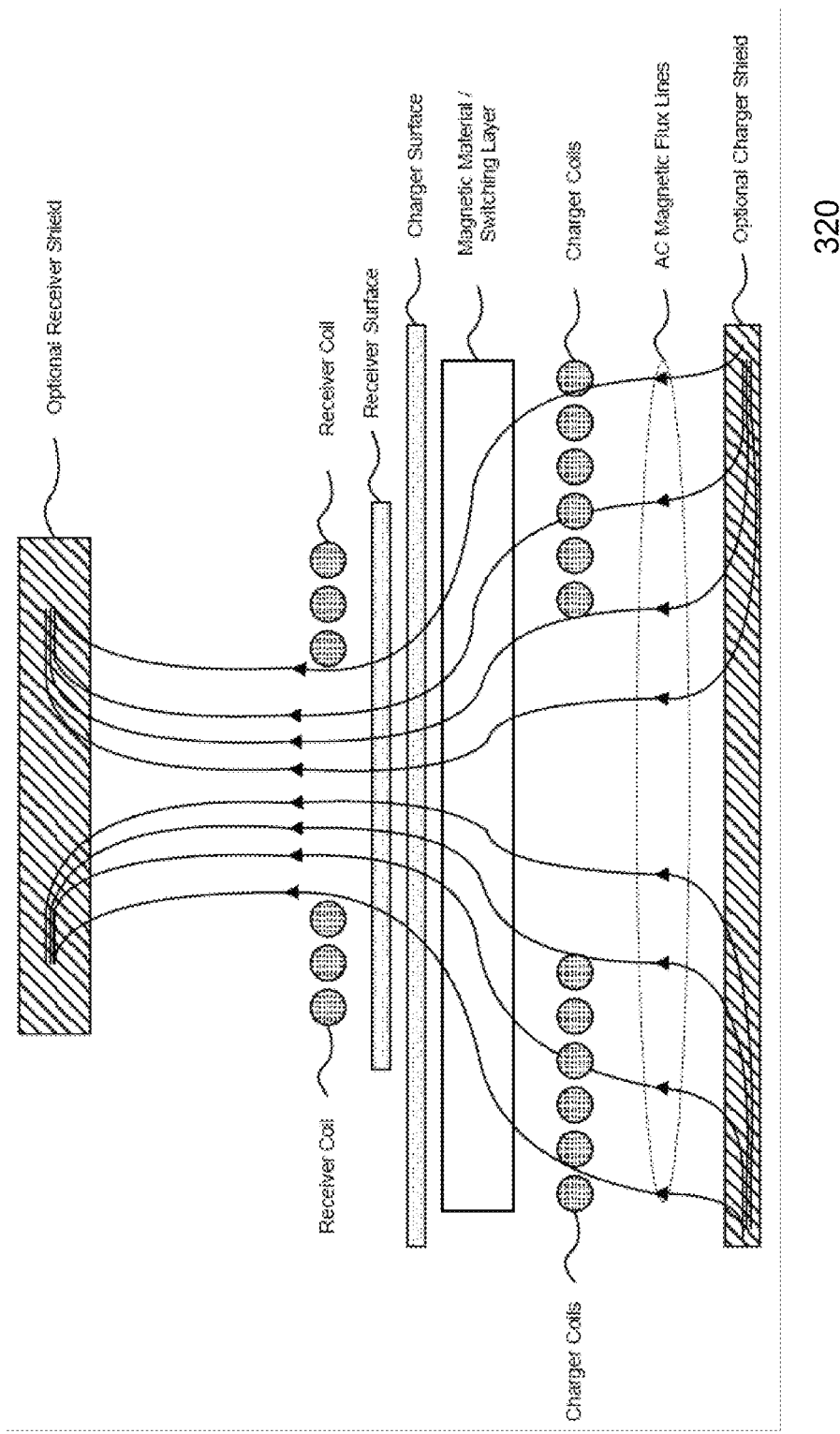
FIG. 20 illustrates a Magnetic Coupling geometry, in accordance with an embodiment.

In U.S. Patent Publication No. 20120235636, a charger coil similar to shown in FIG. 12 with a size of 18 cm×18 cm comprising Litz wire is described as covered with a 0.5 mm thick sheet of material with properties shown in FIG. 17. A circular receiver coil of 7 turns with inner radius 2 cm was placed on top of the charger surface/magnetic layer. This Magnetic Coupling (MC) geometry 320 is illustrated in FIG. 20.

In accordance with an embodiment, the receiver circuit comprises a parallel or in series resonant capacitor, followed by a bridge or synchronous rectifier and smoothing capacitors. Significant power transfer was achieved with receiver coil at distances of several mm to 2-3 cm from the charger surface. The power transfer and efficiency increased with introduction of a 0.5 mm thick ferrite magnetic material or layer above the receiver coil to guide and shield the flux as shown in FIG. 20. The resonance of the charger/receiver circuit in this case was important for operation of the MC configuration. The leakage field from the surface of the charger was reduced by using thicker or higher permeability magnetic layer. Choosing the appropriate magnetic layer and receiver shield/guide layer permeabilities and thicknesses can provide a low reluctance path for the magnetic flux to allow higher power transfer and efficiencies while achieving sufficient field shielding at other locations of the charger.

Power transfer of over 10 W at the output and DC-out to DC-in power transfer efficiencies of over 50% can be achieved in this MC configuration with several mm to 2-3 cm of charger/receiver coil vertical distance. Moving the MC receiver coil laterally across the surface of the transmitter coil confirms that high power transfer and high efficiencies with good uniformity could be obtained across the transmitter surface. The emission from other locations of the charger, where the receiver was not present, were monitored by a probe and shown to be lower by 2 orders of magnitude or more compared to similar locations in a magnetic resonant charger with no magnetic layer. Due to the high permeability of the ferrite layer, this fringing (leaking) field dies away rapidly from the top surface and should not cause significant EMI issues away from the charger. No interference effect with magnetic or non-magnetic metal sheets or ferrites placed on the charger surface were observed, showing that the magnitude of the leakage field from the surface is small and only couples well to the receiver due to the resonant conditions produced by the receiver LC circuit. Also, as expected, multiple receivers can be charged/powered simultaneously in this MC geometry.

In accordance with the MC geometry, the reluctance of the flux path in the receiver can be lowered by including high permeability material in the core of the receiver ring coil (similar to a solenoid) or a T-shape core or alike. Many geometries are possible and these geometries were only given as examples. Additionally, while Litz wire receiver coil was used. PCB coils and/or a combination of Litz wire and PCB coil can also be used.

In accordance with an embodiment, to reduce the reluctance of the path, the receiver coil was created by using a flux guide material (such as ferrite with permeability greater than 1) with an axis perpendicular (or an angle sufficient to catch the substantially perpendicular flux from the charger) to the surface of the charger.

Figure 21:
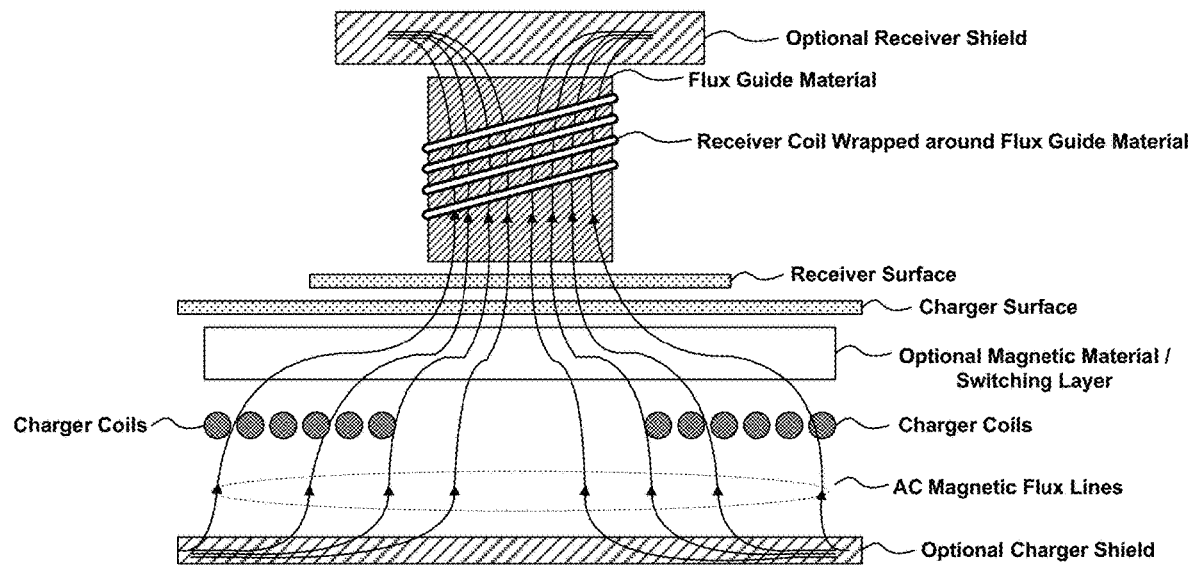
FIG. 21 illustrates an embodiment including a solenoid type receiver, in accordance with an embodiment.

As illustrated 330 in FIG. 21, in accordance with an embodiment, Litz wire can be wrapped around the core to create a solenoid type receiver with a relatively small cross section (2 mmx10 or 20 mm) substantially parallel to the surface of the charger. In one example, the length of the solenoid height (along the direction perpendicular to the surface of the charger) was varied from 10 to 20 mm but can be shorter. In accordance with an embodiment, the flux guide layer can also be as thin as 0.5 mm or less, allowing use of a small volume receiver coil and shield. The typical number of turns on the receiver coil was 7 turns. Substantial power transfer (over 20 W) was received at resonance with the receiver coil bottom on or within several cm of the surface of the charger. Rotating the angle of the solenoid with respect to the perpendicular direction to the surface to the charger produced large power transfers confirming that as long as some component of the charger flux is along the axis of the coil, efficient power transfer can be obtained. Minimal leakage power from other areas of the charger surface was observed and position free and multiple receiver operation can be obtained as expected.

In accordance with an embodiment, as shown in FIG. 21, optionally, an additional shield/guide layer on the top of the receiver and on the bottom of the charger can also be added. Such a solenoid with a magnetic flux guide can be constructed to also have a larger area parallel to the surface of the charger approximating the embodiment in FIG. 20 but with a flux guide layer in the middle of the coil. In this case, the height (along the length perpendicular to the surface of the charger) can be quite short (1-2 mm or less). Use of the flux guide and a smaller cross section parallel to the surface of the charger as shown in FIG. 21 may also be important for applications where small areas for the sections of receiver in the plane of the charger are available. Examples can be devices such as phones, or batteries or 3-d or communication glasses/phones that are longer in 1 or 2 dimensions and would be stood or laid down substantially on their ends or sides to receiver power wirelessly.

In accordance with another embodiment, similar to FIG. 21, a magnetic shield/guide layer was placed under (bottom of) the charger coil, and the receiver comprised a coil with vertically placed ferrite material; however, the magnetic switching layer shown in FIG. 21 was omitted. In this case, it was observed that while the area ratio between the charger surface and the receiver coil area in parallel to the charger surface was 50 or more to one, efficient power transfer from the charger to the receiver can be achieved. This is due to the strong tendency of the flux generated by the charger to channel to the receiver coil location, rather than flow in areas in contact with air. In this manner, position freedom and high efficiency power transfer over a large area can be achieved.

As described previously, in accordance with an embodiment therein the charger/transmitter also can include magnetic flux guide layer/shield at the bottom of the charger as shown in FIGS. 20 and 21 so that emissions from the bottom of the charger/transmitter are reduced and magnetic flux is guided. In yet another embodiment described therein, metal layers were also included on the top of the receiver shield and/or the bottom of the charger/transmitter shield to provide further shielding from the magnetic field.

For a transmitter coil of geometry in FIG. 12 with several A of current in the coil (currents used here), the incident magnetic field is estimated to be in the 100 $A/m^2$ to several 100 $A/m^2$ range (see FIG. 13). Care should be taken so that the magnetic material is chosen such that magnetic saturation does not occur. However, in the region of power transfer between the charger and the transmitter coil the magnetic field is enhanced by the resonance and the Quality Factor (Q) of the system and a much larger magnetic field may be present. As described previously, in these tests, the Q of the system was about 30. Thus it may be possible that in the power transfer location under the receiver coil, the magnetic layer can experience saturation and reduction of permeability to provide a more efficient path for the flux from the charger coil to transmit to the receiver coil above and increased power transfer and efficiencies. By choosing magnetic layers with appropriate saturation field values, this effect was used to benefit as described above.

Magnetic Aperture (MA) Geometry

In accordance with another embodiment described in U.S. Patent Publication No. 20120235636, a Magnetic Aperture (MA) can be created in a magnetic shield or ferromagnetic layer at any desired location, so that the magnetic field confined in such a layer at that location is efficiently coupled to a receiver coil and can provide power transfer to such a receiver. At any other location on the transmitter coil, the confinement of the field prevents or reduces unnecessary radiation, thereby providing low EMI and adverse health and interference effects.

Several methods to enable local change (switching) of the characteristics of the ferromagnetic material in the MA geometry are described in U.S. Patent Publication No. 20120235636. In accordance with an embodiment described therein, the local characteristics of the ferromagnetic, ferrite, or other magnetic material or layer were altered by saturating the layer through application of a DC and/or AC magnetic field such as through a permanent magnet or electromagnet, or a combination thereof. For example, a magnet or electromagnet can be incorporated behind, in front, around or at the center of the receiver coil or a combination thereof such that it has sufficient magnetic field to saturate or alter the magnetization curve of the ferromagnet layer locally on or near where the receiver coil is placed.

Figure 22:
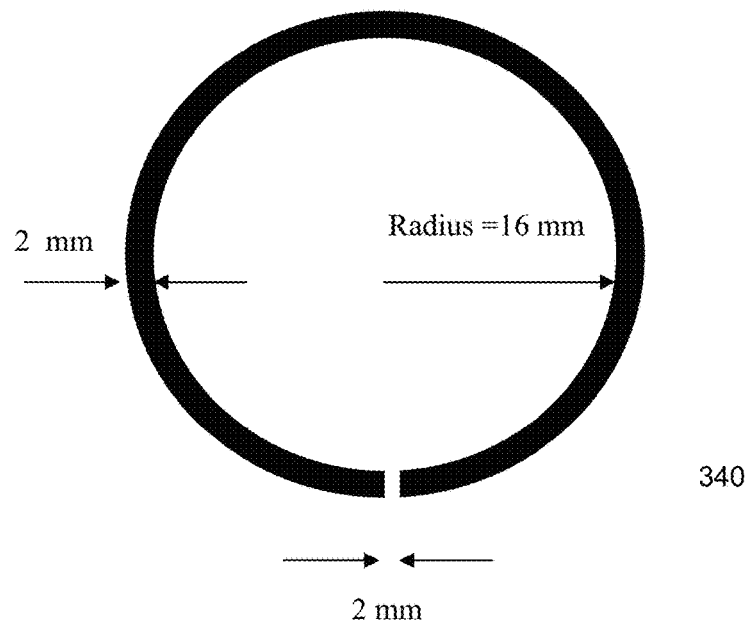
FIG. 22 illustrates examples of magnets, in accordance with an embodiment.

Examples of magnets that were used include, e.g. one or more disc, square, rectangular, oval, curved, ring (e.g., 340 in FIG. 22), or any other shape of magnet and combination thereof and with appropriate magnetization orientation and strength that can provide sufficient DC or AC magnetic field to shift the operating position of the magnetization curve (as shown in FIG. 15 or 18), so that the combination of the transmitter coil, the affected ferromagnet layer and the receiver coil move to a resonance condition at a given frequency for power transfer.

Figure 23:
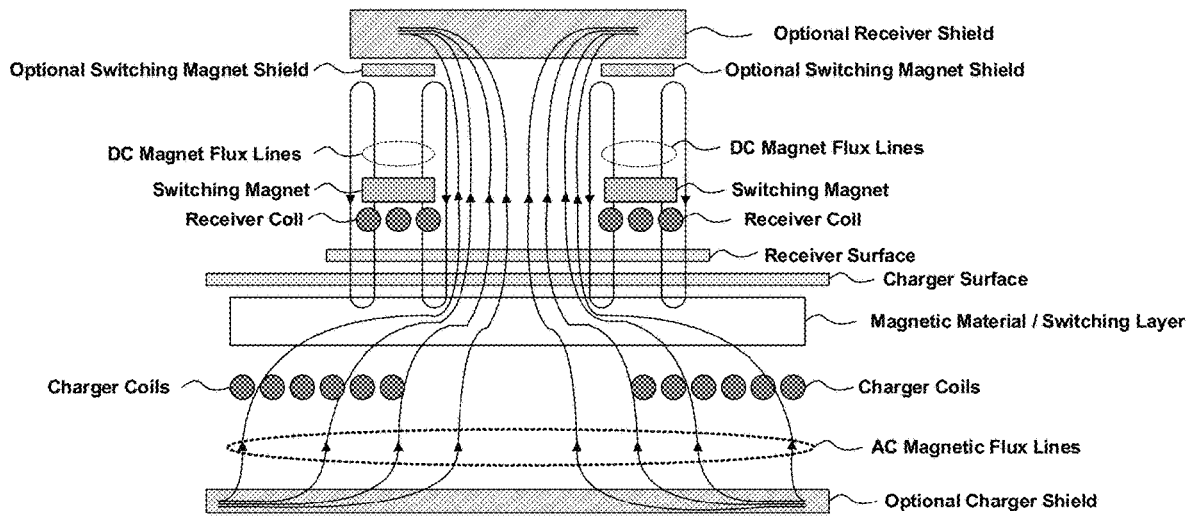
FIG. 23 illustrates a Magnetic Aperture geometry, in accordance with an embodiment.

As illustrated in FIG. 23, in accordance with an embodiment of MA, by incorporating a permanent (and/or electromagnet) into the receiver in front, and/or behind and/or at the level of the receiver coil (on the outside and/or inside of the coil), and bringing the receiver close to the charger surface, at this point, a local 'magnetic aperture' is opened up in the ferromagnetic, ferrite, or other magnetic material or layer, allowing the transmitter coil's electromagnetic field to be transmitted through this local aperture without affecting any areas nearby.

In this manner, by reducing the permeability of the ferromagnet layer locally through saturation or reduction with the DC and/or AC field or other means, one can establish at what location the power and energy coupling should occur while keeping the field confined in other areas. The magnetic or ferrite material layer is here therefore also alternatively called a switching layer. This layer acts as both a reservoir and/or guide layer of AC magnetic flux (for power transfer) and a switching layer.

This embodiment can be used to meet the goal of simultaneously transferring power efficiently to a receiver at any desired location while keeping the field from emitting at other locations and causing problems. At the same time, since the magnetic field created from the entire surface of the charger coil is directed or guided towards the magnetic aperture created, this provides an effect analogous to funneling the power to this magnetic aperture area and an efficient method for transfer of power to an arbitrarily positioned receiver is achieved.

In FIG. 23, as described previously, the receiver can also include an outer surface or case. Such a surface or case would be typically located between the receiver coil and the charger surface parts, as shown in FIG. 23.

Figure 24:
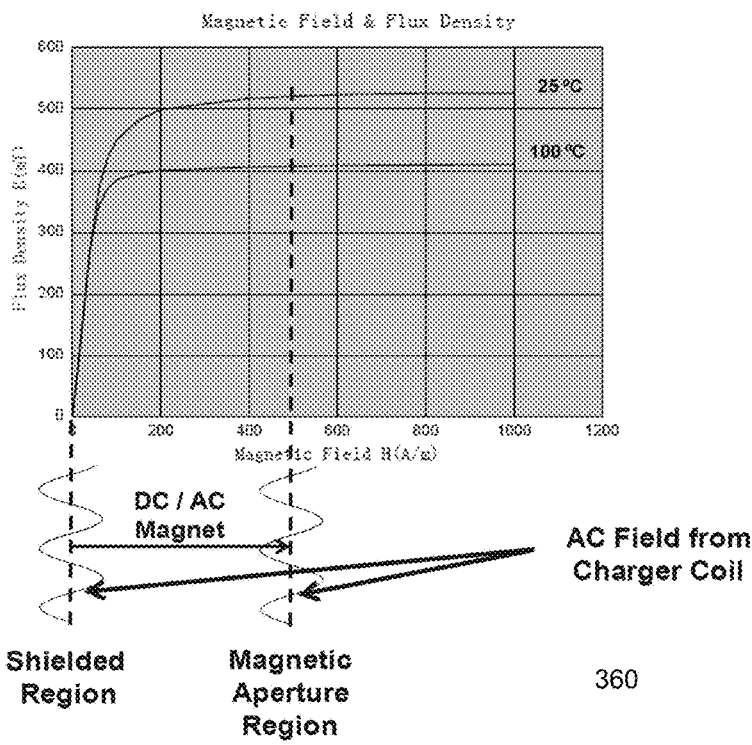
FIG. 24 illustrates magnetization curves of a soft ferrite material

FIG. 24 provides an illustrative method of understanding the behavior 360 of the systems described previously. Magnetization curves of a soft ferrite material are shown at different operating temperatures. The AC magnetic field generated by the wireless charger/power supply coil is also shown in two regions of operation (shielded region and the magnetic aperture region). Most of the surface area of the ferrite layer has no receiver on it and operates in the shielded region with high permeability guiding and shielding the AC magnetic field generated by the charger/power supply coil in the transmitter from the outside. In the magnetic aperture region (where the receiver and the switching magnet is), the DC (and/or AC) magnet acts as a bias to move the operating point from around the vertical axis where the material has high permeability and confines and guides the magnetic field to a region where the material is saturated and has a low permeability creating a magnetic aperture for coupling to a receiver coil nearby causing efficient power transfer. The magnetic field required for saturating the switching material (the magnetic switching field) can be easily created by many types of commonly available magnets that can generate up to several 100's of A/m or more of magnetic field easily saturating many ferrite materials.

Figure 25:
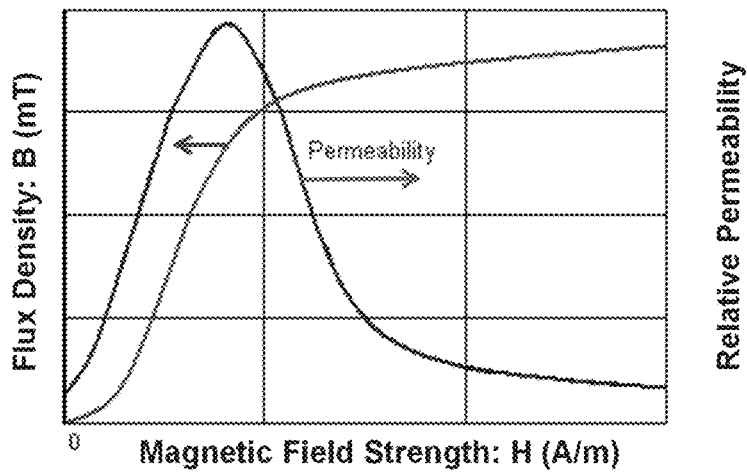
FIG. 25 illustrates variation of the permeability with applied magnetic field.

FIG. 25 is another representation 370 of the variation of the permeability with applied magnetic field showing the initial increase of permeability at low magnetic fields and then decrease with increased values.

As can be seen above, the MC and MA approaches described in U.S. Patent Publication No. 20120235636 utilize the nonlinear behavior of ferrite material to act as an active switch to provide power transfer only in desired locations. Permeability is an inherent material property of a magnetic material and the response time of the material is only limited by domain movements and can be in nano seconds or faster depending on the material. It is therefore one of the advantages of this system that the device responds almost instantaneously, and, if a receiver is moved on the surface, a new aperture is created and shielding is restored at all other locations almost instantaneously.

In comparison, other wireless charger systems such as those that use coil arrays, moving coils, etc. have a slow response to such movement due to time lag related to mechanical movement of coil and/or electronic detection and reconfiguration of an electronic system.

Furthermore, multiple receivers (with switching magnets) can be placed on or near the charger surface to create multiple magnetic apertures for coupling of power to multiple receivers while maintaining shielding and low electromagnetic emission at all other locations providing a simple to use, efficient multi-charger system.

In accordance with an embodiment, to provide shielding from the magnetic field at locations below the transmitter coil (the side opposite to the charging/power side of the transmitter) and above the receiver coil (on the side of the coil that may be in close contact with a device, battery, or electrical part being powered or charged wirelessly), further shielding layers such as ferromagnet and/or metallic layers can also optionally be added below the transmitter coil and/or above the receiver coil as necessary. Furthermore, these layers can be integrated into the coil design (such as metal shield layers integrated into a PCB multi-layer design that includes a PCB coil). The choice of material and thickness can be chosen such that even though a magnet in the receiver can be used to saturate (switch) the top layer of the transmitter (the switching layer), the permeability of the shield layers would not be affected.

For example, the switchable layer in the charger can comprise material with low saturation field values while the other shield layers in the charger and/or receiver have higher saturation field values. Examples of materials to use for these shields can be sheets or other shapes of material such as ferrites, nano materials, powder iron (Hydrogen Reduced Iron), Carbonyl Iron, Vitreous Metal (amorphous), soft Iron, laminated Silicon Steel, Steel, etc. or other material used in transformer core applications where high permeability and saturation flux densities as well as low eddy current heating due to conductivity at frequency of operation is required.

Lamination has also been used in many applications of transformers to reduce eddy current heating. To avoid saturating the ferrite shield from the switching magnet in the receiver, the shield can also be multi-layer or other structures can be used. For example, in an embodiment described previously, a thin high saturation flux density layer (of, e.g., powdered Iron or steel) can be placed behind the switching magnet (as shown in FIG. 23) to shield from the switching magnet field with another optional ferrite layer of other characteristics such as higher permeability or operation at the AC magnetic field frequency above that. Thus the high saturation flux density layer will shield the high permeability layer from the saturating effects of the magnet and allow it to guide and shield the AC magnetic field effectively.

In accordance with another embodiment described previously, the high saturation shield layer is formed or manufactured to have a shape and dimensions to fit the magnet's switching magnetic field pattern to shield the field from it and allow the AC power magnetic field from the charger that is coming through the created magnetic aperture to extend upwards (in FIG. 23) to another shield or ferrite layer with different characteristics. For example, in the geometry of FIG. 23, if a ring type of switching magnet is used, the high saturation shield material can be ring shaped with appropriate dimensions and placed behind (atop in FIG. 23) of the magnet to shunt or reduce the field from the magnet and a sheet of ferrite is placed on top of the high saturation shield layer to guide and shield the AC magnetic power transfer flux coming through the center of the coil as shown in FIG. 23. Many combinations of the above techniques and materials have been described previously in the receiver and charger to best optimize performance and these embodiments were only given as examples.

Figure 26:
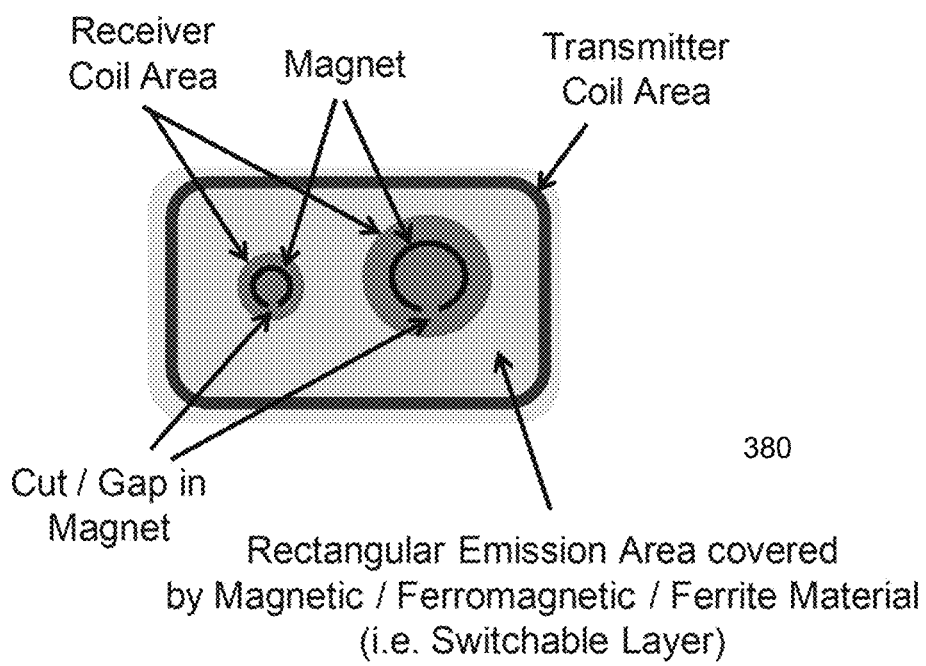
FIG. 26 illustrates use of a switchable layer with two receivers of dissimilar size and possibly power ratings and/or voltage outputs, in accordance with an embodiment.

The overall geometry 380 described in U.S. Patent Publication No. 20120235636 of the MA for operation with the switchable layer and the receiver and magnet is shown in FIG. 26 for two receivers of dissimilar size and possibly power ratings and/or voltage outputs. FIG. 23 shows a simplified side view of a wireless power system in accordance with an embodiment, showing a charger (transmitter) and receiver coil, switching layer, and switching magnet. In this instance, a ring switching magnet is shown and the coils are described as circular ring coils for simplicity. However, in accordance with other embodiments, other geometries and designs can be used to achieve similar results. For example, as described above, the coil can be configured to achieve a more uniform field pattern and/or the magnet can be of a different shape and magnetization orientation. In addition, the magnet can be placed in front of, behind, or on the same plane as the coil and/or the coils can be made of wires, PCB, free standing metal parts or a combination thereof or other geometries and materials.

In accordance with various embodiments, methods and processes are described to increase the efficiency and vertical operating distance (charger coil to receiver coil gap) of wireless charger systems. In addition, these embodiments provide more flexibility in design of wireless charger systems.

As described previously, several methods to allow positioning freedom of one or more receivers on a wireless charger system have been developed. Broadly, as described above, they include the loosely-coupled (alternatively known as magnetic resonance in some literature), Magnetic Coupling, and Magnetic Aperture technologies. While much attention has been paid to the coil structure and in MC and MA geometries to the magnetic or ferrite switching layer covering the charger, the shield layer above the receiver coil and below the charger coil beyond shielding the device or outer environment can also play an important role. In accordance with an embodiment, the system described here can use these layers beneficially to enhance the performance of the wireless charger systems.

Wireless Charging System with Enhanced Performance Using Flux Guiding

Figure 27:
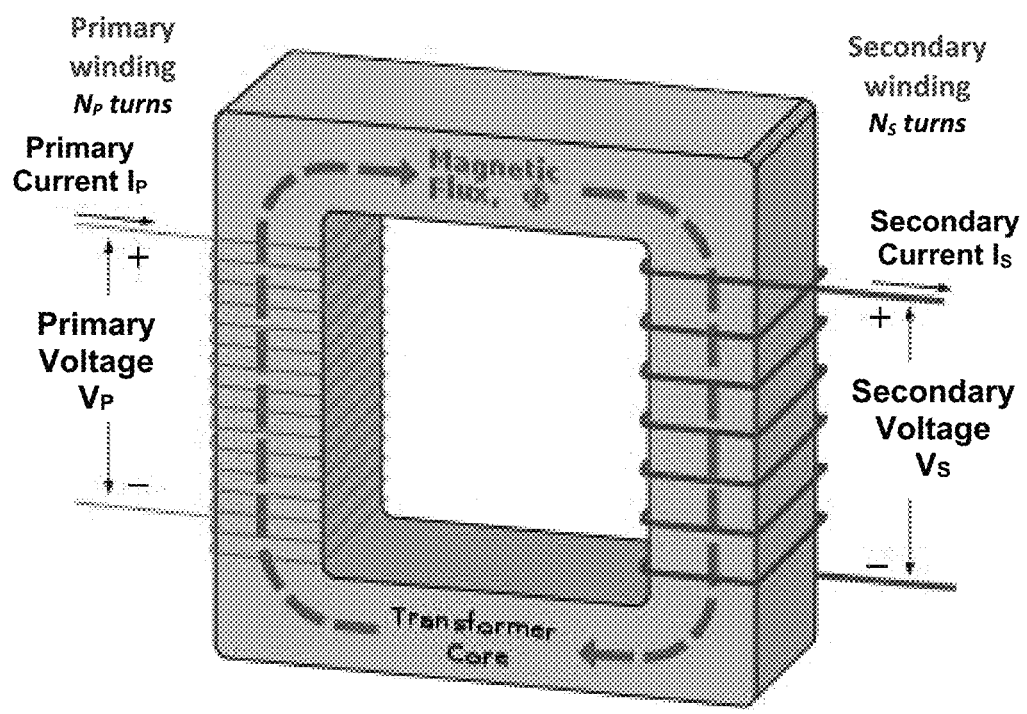
FIG. 27 illustrates a transformer geometry where a common magnetic core has a primary and secondary wire winding wrapped around its two sections, in accordance with an embodiment.

FIG. 27 illustrates a transformer geometry 390 where a common magnetic core has a primary and secondary wire winding wrapped around its two sections. The ac current passing through the primary winding creates an alternating magnetic flux that is well contained in the high permeability material of the core and travels to the core section at the center of the secondary winding where it creates an induced voltage. The number of the windings in the primary and secondary define the step down (or step up) voltage ratio of the transformer which essentially acts as an impedance matching network stepping down (or up) the voltage while stepping up (or down) the current. For the transformer to operate efficiently, the flux path (or magnetic circuit) should minimize loss of the magnetic energy. The concept of magnetic reluctance, which is analogous to resistance in electrical circuitry, has been created to help analyze the performance of magnetic structures and transformers including varied magnetic and non-magnetic material and spacers or air.

Figure 28:
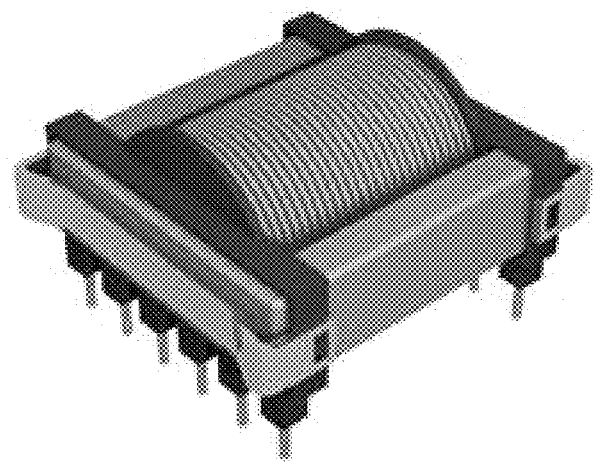
FIG. 28 illustrates a view of a transformer comprising two ER-Cores (rounded E-Core), in accordance with an embodiment.
Figure 28:
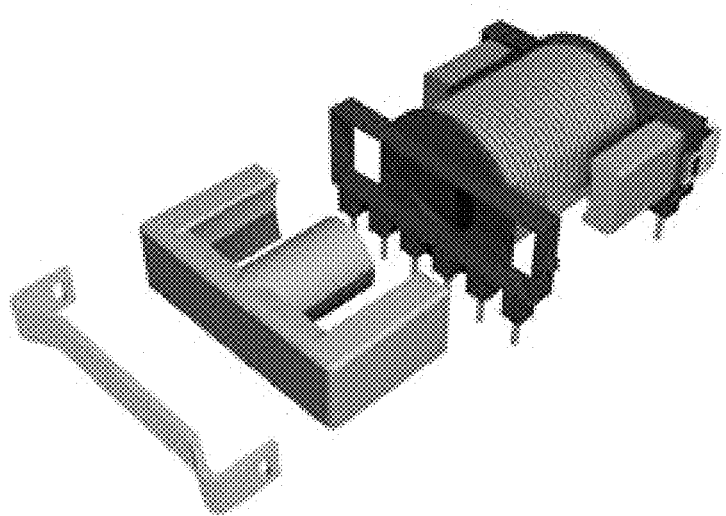

A variation of the basic transformer that is often used is the E-Core or ER-Core (rounded E-core) transformer, where an additional middle flux carrying section is included. For example, FIG. 28 illustrates a view of a transformer 400 comprising two ER-Cores (rounded E-Core). The primary winding generates a flux in the central section that is carried by and splits into two paths that return and surround the winding on the outside. An exploded view of the same transformer is shown in FIG. 28, illustrating the two ER-Cores 410 more clearly.

Figure 29:
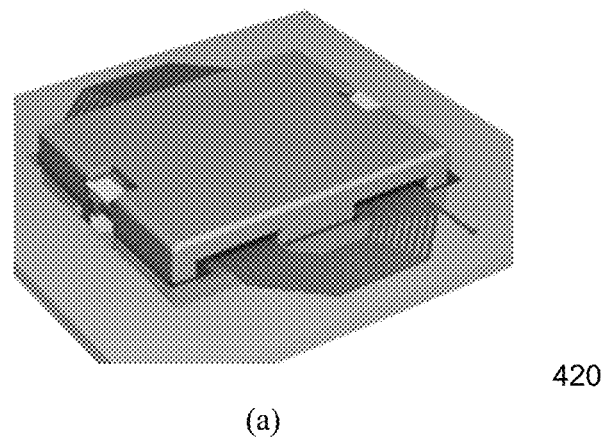
FIG. 29 illustrates a view of a transformer including an E-Core and a flat section and PCB primary and secondary coils, in accordance with an embodiment.
Figure 29:
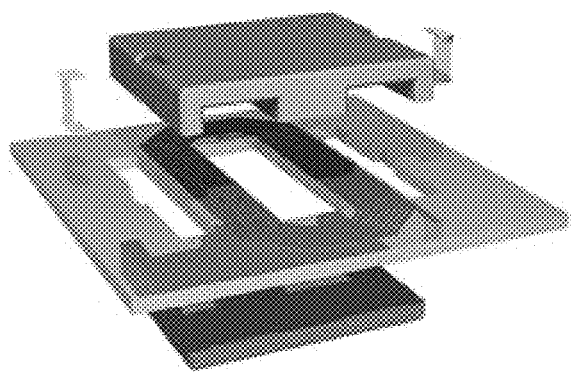

E-Core transformers are also used in planar transformers, where to save space it is common to provide the windings as flat PCB coils. FIG. 29 illustrates a view of a transformer 420 including an E-Core and a flat section and PCB primary and secondary coils. The primary winding generates a flux in the central section that is carried by and splits into two paths that return and surround the winding on the outside. The flux is then guided by the flat section back to the central section of the E-core. An exploded view of the same transformer is also shown in FIG. 29 showing the E-Core, the flat section and the windings 410 more clearly.

In accordance with an embodiment, in the geometries described above, and for other transformers, a variety of magnetic or ferrite materials can be used to keep the flux contained in the core.

The MR, MC and MA wireless power systems have some similarities to the transformers described. For example, the planar E-core transformer with planar coils has similar flux patterns to those shown in FIGS. 20, 21 and 23. The flux from the wireless charger systems shown in FIGS. 20, 21, and 23 is focused only on the section where the receiver is present, and flows upwards through the receiver coil in these geometries, then flows outward before closing on itself below the charger coil. The optional magnetic shields at the top of the receiver and below the charger not only shield the environment from this magnetic flux but provide a relatively low reluctance path for the flux to travel to close upon itself. However since these layers are separated by a distance and the charger shield is covered by another magnetic layer (switching layer), an efficient low reluctance path for return of flux is not provided in these geometries. This may result in the flux leaking to surrounding areas causing unnecessary interaction with metals and devices nearby or resulting in unnecessary emissions or loss of power transfer efficiency or power. In accordance with embodiments described herein, several geometries where this return flux path is improved to allow the flux to be guided to return back to the charger are described. By application of these techniques, higher efficiencies and power transfer and lower susceptibility to the gap between the charger and receiver coils and lower undesirable emissions can be achieved greatly enhancing the usefulness of wireless power and charger systems.

Figure 30:
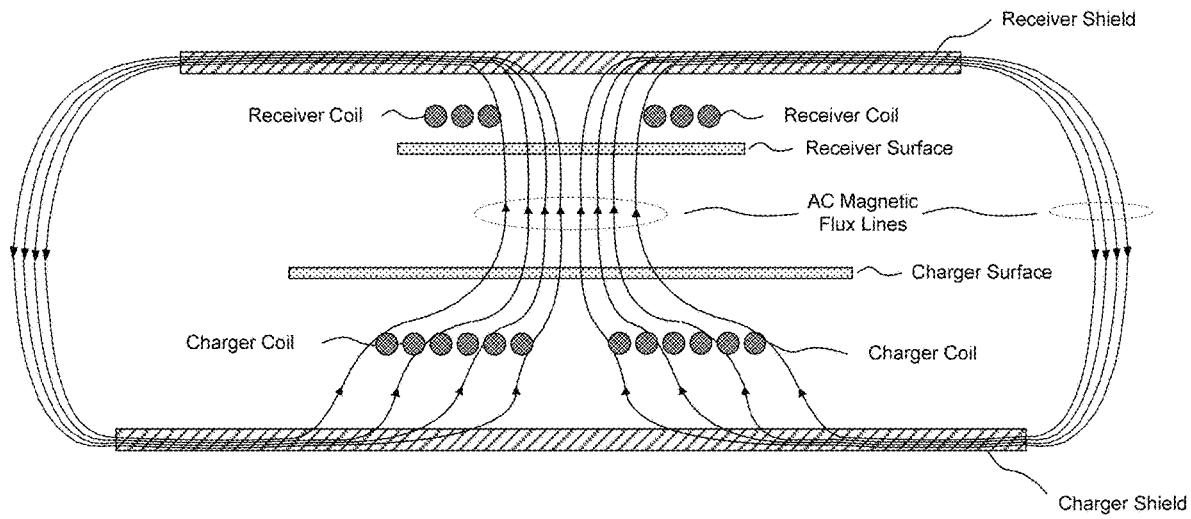
FIG. 30 illustrates a Flux Guide geometry, in accordance with an embodiment.

In accordance with an embodiment shown in FIG. 30 for an improved Magnetic Resonance (MR) or loosely coupled geometry 440, the charger coil transmits power to one or more receiver coils. The receiver has a magnetic shield/guide layer that extends in one or more dimensions over the edge of the receiver coil. The charger coil also has a magnetic shield/guide layer or surface under it that extends beyond the area of the coil in one or more dimensions. In this geometry, the flux from the receiver coil has a low reluctance path to complete a flux loop, thus providing for higher efficiencies, ability to operate at larger coil to coil gaps and for lower emitted field to the surroundings.

In accordance with an embodiment to further facilitate coupling of the magnetic field to the receiver coil(s), the receiver system may incorporate an additional magnetic material in the center of the receiver coil such as shown in FIG. 30. This component may comprise the same or different material that is used behind the receiver coil and its properties may be optimized for its particular use. As an example, solid or flexible Ferrite material with a desirable permeability can be incorporated. The core may only have the thickness of the PCB or Litz wire receiver coil and as such may have thickness of several tenths of millimeter and be of minimal thickness and weight. However, incorporation of this core to the receiver coil may affect the receiver coil inductance, and considerably affect the efficiency and power handling capability of the system.

FIG. 30 shows the incorporation of a magnetic core to the central area of a Flux Guide system. In accordance with other embodiments, the magnetic core can be added to the MR, MC, and MA receiver systems described earlier to similarly enhance their performance.

Figure 31:
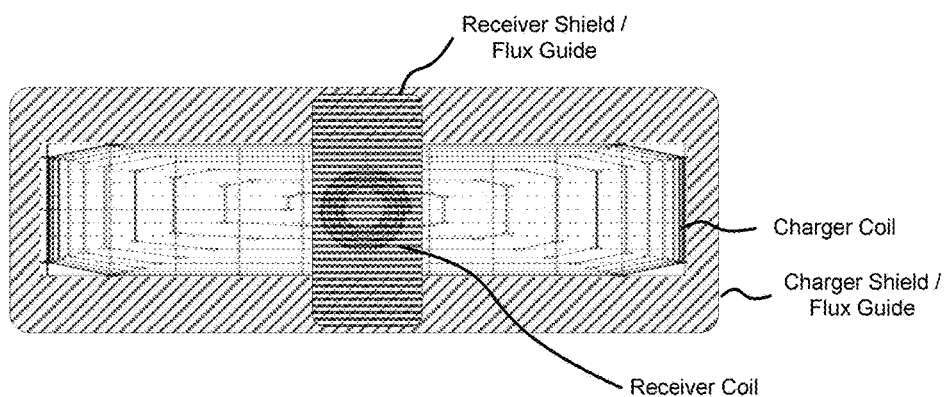
FIG. 31 illustrates a representative top view of a receiver placed on a charger, in accordance with an embodiment.

A representative top view of a receiver placed on the charger is shown in FIG. 31. As shown 442 therein, the receiver shield/flux guide layer is shown as extended in one dimension beyond the coil (in Y axis), and the charger shield layer under the charger coil is extended in one or two dimensions so that, during operation, the flux generated by the charger flows upwards, through the receiver coil, and is then guided in the y direction as shown by the receiver flux guide layer, before flowing down through the charger shield/flux guide layer upon itself. The corresponding side view (looking from the left side of FIG. 31 towards the center) is as shown in FIG. 30 above.

Figure 32:
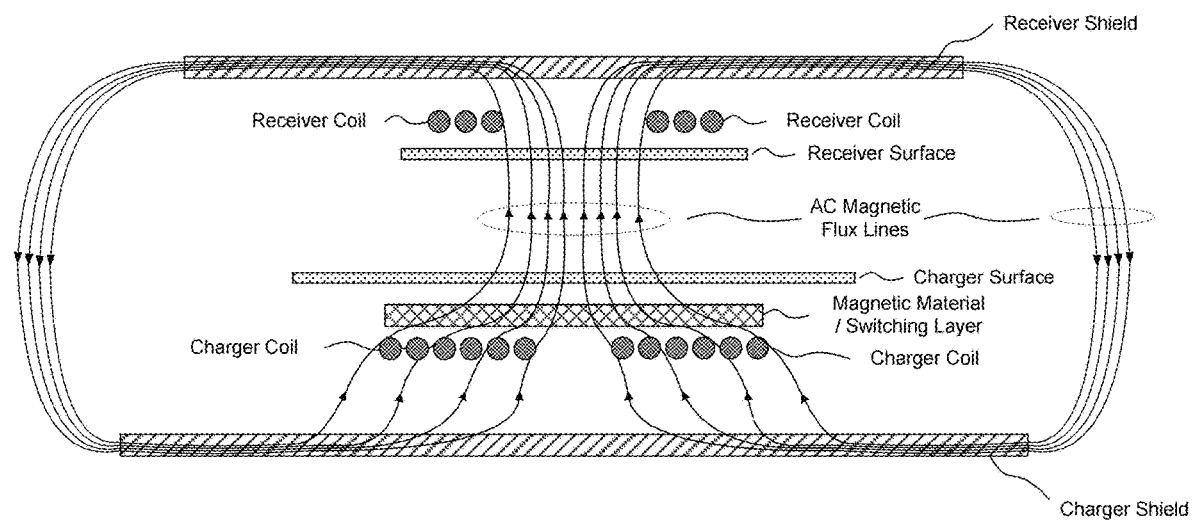
FIG. 32 illustrates a Magnetic Coupling geometry where the charger coil is covered by a magnetic or switching layer, in accordance with an embodiment.

As described above, the MR geometry suffers from lack of confinement of charger flux thus resulting in large undesirable emissions, susceptibility to metal, and low efficiency. To overcome these effects, the MC and MA geometries have been described previously. FIG. 32 shows an improved MC geometry 450 where the charger coil is covered by a magnetic or switching layer and through build-up of magnetic field strength in the area between the charger and one or more receivers operating at resonance, the material is saturated locally at this location and confined efficient power transfer can be achieved. By extending the area of the receiver and charger shields or flux guide layers beyond the area of the charger coil in one dimension or more, a low reluctance path for the return magnetic flux is created. The geometry was tested with a 6×17 cm area Litz wire helical coil similar to the coil in FIG. 12 but contracted in the Y dimension.

Figure 33:
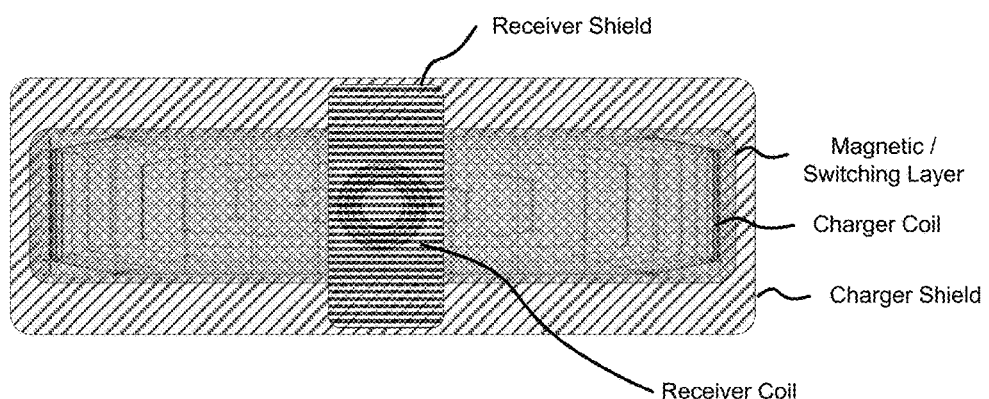
FIG. 33 illustrates a representative top view of a receiver placed on such a charge, in accordance with an embodiment.

A representative top view of a receiver placed on such a charger is shown 452 in FIG. 33. The corresponding side view (looking from the left side of FIG. 33 towards the center) is as shown in FIG. 32 above.

Figure 34:
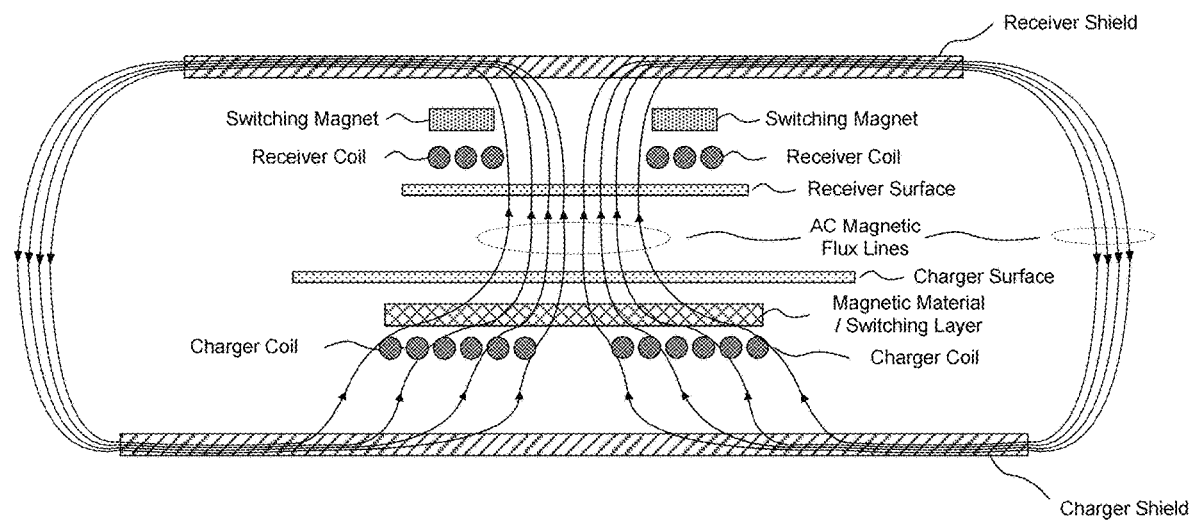
FIG. 34 illustrates an example of a Magnetic Aperture coil combined with flux guide layers, in accordance with an embodiment.

In accordance with another embodiment as shown in FIG. 34, the Magnetic Aperture (MA) geometry can be combined with flux guide layers to provide better flux paths. As shown in FIG. 34, to assist local flux flow from the charger to the receiver, a magnet can be added to the receiver, compared to the MC and flux guide geometry shown in FIG. 32. The corresponding top view for this embodiment would be similar to that shown in FIG. 33 except that a switching magnet would be added to the receiver. As described earlier, in accordance with various embodiments this magnet may have various shapes and sizes, to optimize the local saturation of the switching layer.

As another example, FIG. 33 shows an example of the coil geometry 452 used for a combined MC and flux guide geometry. This geometry is not unique and many other shapes and sizes can be used. As described earlier, Litz wire, PCB coil or a combination of types of coils can be used. In a tested system, the charger coil was covered by a 0.5 mm thick layer of ferrite material of 70×180 mm area (comprising tiles or wafers of ferrite) with relative real permeability values of around 1400 at frequencies of below 1 MHz. The charger shield/flux guide layer comprised 0.5×120×200 mm layer of the same ferrite material (comprising 50 mm×40 mm tiles or wafers of the material) separated from the coil by 5 mm of vertical gap. The receiver was a Litz wire coil with 50×40 mm area and 7 turns and had a receiver shield/flux guide layer of 0.5×50×90 mm of same ferrite material attached directly above the coil.

To test the performance, the charger coil was attached to a resonant converter (similar to the charger shown in FIG. 2) and the receiver coil was connected to a parallel capacitor and a receiver circuit comprising diode rectifiers and smoothing capacitors. The resonant capacitor values were chosen to bring the 2 parts close to resonance around 160 kHz. The DC input and output powers were monitored while the system was brought close to resonance from the high frequency side. High power transfer efficiency (over 15 W) and efficiency (over 65% DC to DC efficiency) was obtained while the receiver could be moved around in X and Y direction on the charger. It should be noted that it is not necessary for the receiver coil to be completely on the charger coil to receive power. It was found that even partial overlap of the coils resulted in large power transfer. Insensitivity of the charger to metal objects was confirmed by placing metallic sheets on the charger surface confirming that Magnetic Coupling (MC) method of operation was responsible for power transfer while the charger top shield layer provided shielding of stray unwanted magnetic fields.

The emitted near field magnetic pattern of the system was next mapped with placing a 2 d magnetic field scanning table on top of the receiver and the output of the 2-D array of coils embedded in the table were fed to a spectrum analyzer. Tuning the spectrum analyzer to the fundamental frequency of operation during power transfer, a 2-D map of any stray unwanted emissions were mapped. The resulting signal was extremely small and only a signal of several microvolts corresponding to very small stray AC magnetic fields was observed over the receiver confirming the high degree of confinement and flux guiding in this structure.

Next the receiver was separated from the charger surface by up to 3 cm vertically (in the direction perpendicular to the surface of the charger). Similar power transfer values with minimal loss of efficiency (by 2-3%) compared to the small coil to coil gap condition was observed. The stray emitted near field magnetic fields were similarly negligible. Thus by employing the flux guide layers in accordance with various embodiments, high efficiencies, transferred power levels and coil to coil gaps can be obtained with low emissions.

Figure 35:
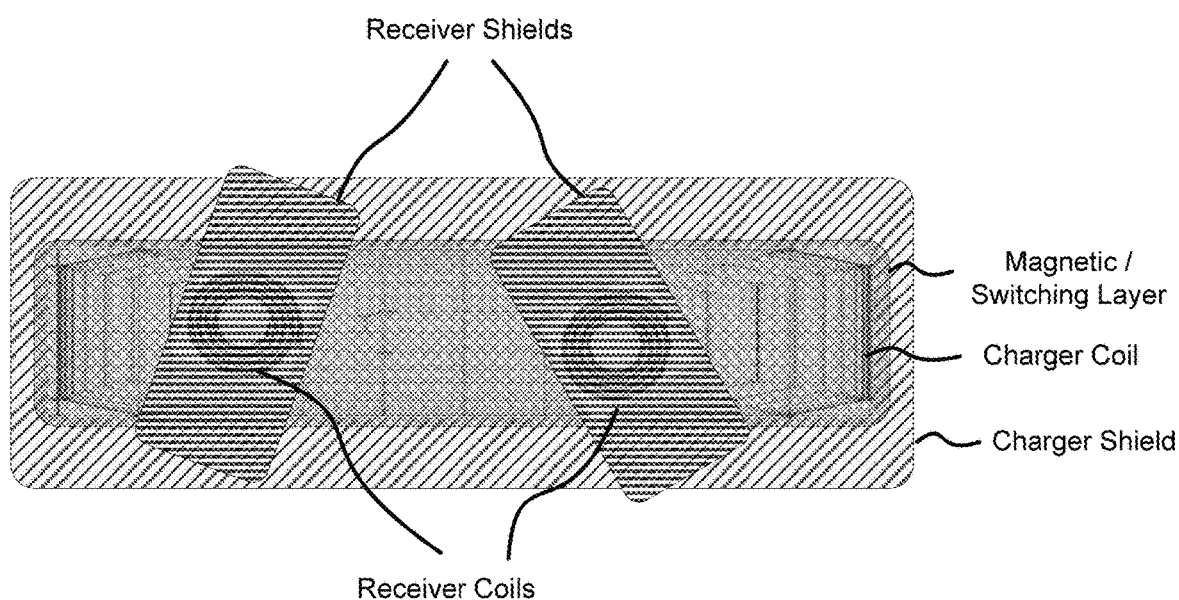
FIG. 35 illustrates a top view of a receiver placed on the charger, in accordance with an embodiment.

In accordance with an embodiment 464 shown in FIG. 35, two or more receivers of same or different size can be placed on the charger to receive power simultaneously. As described in the MA and MC geometry, multiple methods for controlling and regulating power output can be employed in these embodiments.

Figure 36:
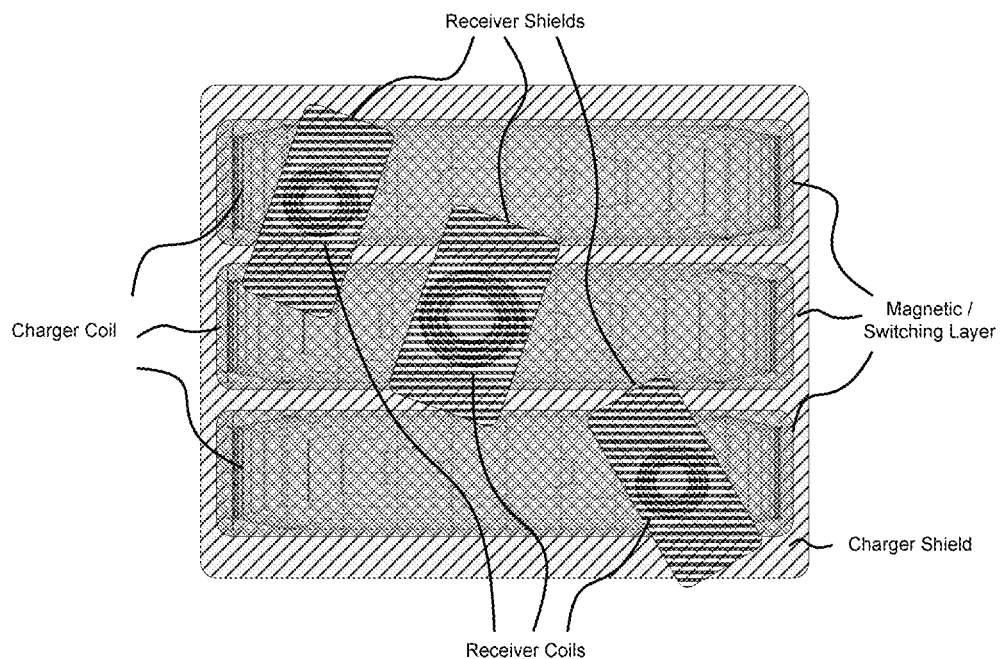
FIG. 36 illustrates two or more receivers of same or different size placed on the charger, in accordance with an embodiment.

Another embodiment 466 for larger charger surface area is shown in FIG. 36. Here, on the top (the charger side), several coil areas with their tops covered by ferrite switching shields are used. These active areas are interspersed with areas with no active coils or top shield. The charger has one or more lower flux guide layers to complete the flux path as shown in FIGS. 30-35. One or more receivers can be placed on the charger to receive power. The voltage and power levels of the different receivers can be different. Thus the charger can be a universal position free system for multiple devices using different power, voltage and sizes.

Figure 37:
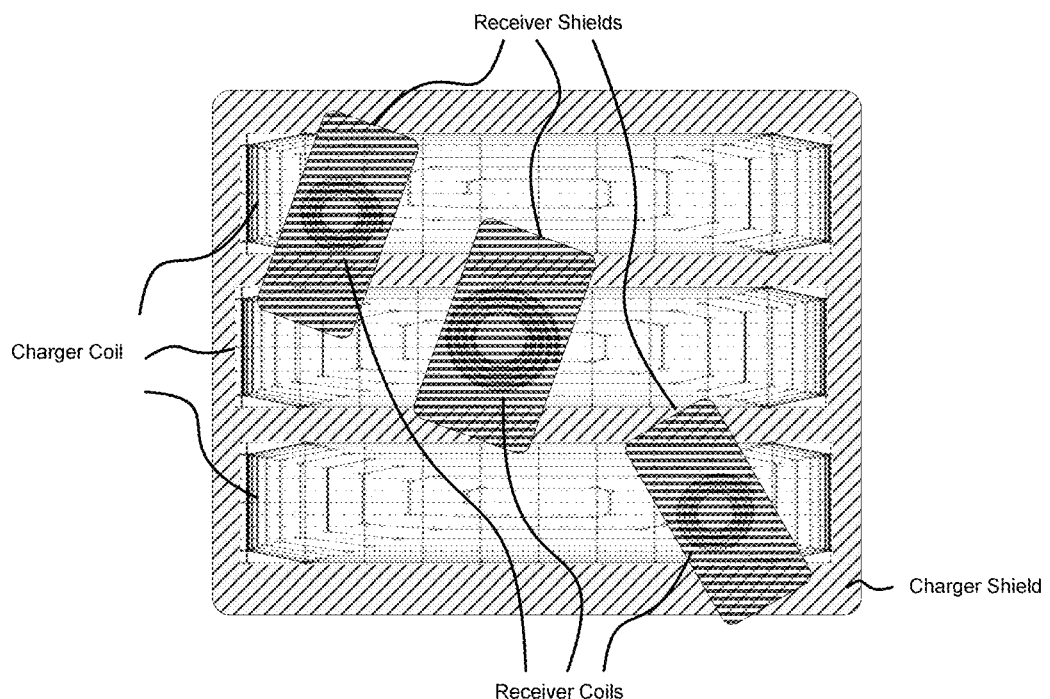
FIG. 37 illustrates an embodiment having a larger charger surface area, in accordance with an embodiment.

In accordance with another embodiment 468, using only the flux guide techniques described above, as shown in FIG. 37, the magnetic switching layer can be omitted, and multiple active charger coils used to increase the charger active area.

In the geometries described above with the receiver resonant capacitor connected in parallel to the receiver coil it is observed that the receiver output voltage is highly dependent on the current drawn by the output load. In accordance with an embodiment with the receiver resonant capacitor connected in series with the receiver coil (as shown in FIGS. 1-4), it is observed that very high degree of output voltage stability can be obtained over a large voltage range.

Figure 38:
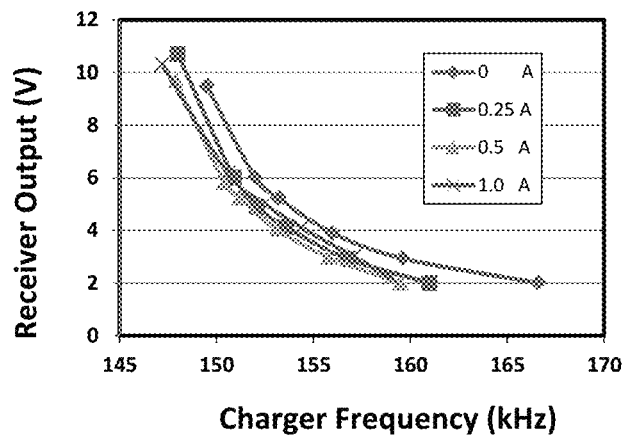
FIG. 38 illustrates output rectified voltage from a receiver as a function of frequency.

FIG. 38 shows the output rectified voltage 470 from a receiver (with a 100 nF series resonant capacitor and the flux guide layers as described above) as a function of charger or transmitter operating frequency for different output currents (i.e. output load values). In this embodiment, the resonant converter of the charger is operated at the high frequency slope of a gain peak such as the one shown in FIG. 14. Higher transmitted voltage (and power) is obtained at higher frequencies. It can be seen that the output voltage is remarkably constant for different output currents at a fixed frequency. For example, at 153 kHz, the output voltage changes from 5 to 4 V for current output changing from 0 A to 1 A. This improvement in stability allows easy regulation of the output voltage by several techniques. In an embodiment, the regulation can be carried out simply by a linear, switching, or other regulator in the output stage. In another embodiment, this regulation can be accomplished with changing the frequency, duty cycle or input voltage of the charger through communication between the receiver and charger as described earlier whereby the receiver transmits the receiver voltage, current, or other parameter or the difference between this value and a desired value to the charger which responds to this by adjusting its frequency, duty cycle and/or input voltage or a combination thereof to achieve the desired operation.

In accordance with an embodiment, it may be advantageous to construct the charger/transmitter coil from ferromagnetic material with appropriate property so that the coil acts as both the magnetic field generator and the magnetic shield for MA and MC geometry. This may eliminate the need to have an additional magnetic or ferrite layer on the top surface of the charger/transmitter. Alternately, to retain desirable high conductivity and Q of the transmitter and/or receiver coils and to achieve the switching effect, a metallic coil of PCB and/or wire may be coated or covered with a switching magnet material such as ferromagnet.

Figure 39:
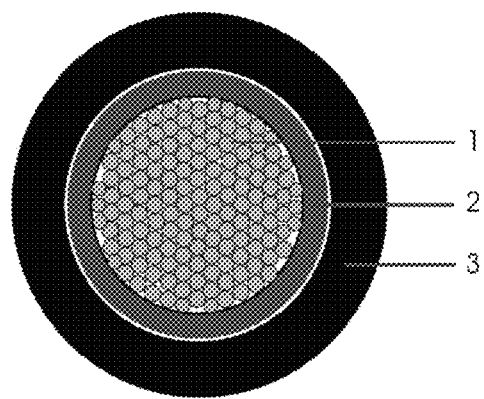
FIG. 39 illustrates wire or cable, in accordance with an embodiment.

FIG. 39 shows a commercially available wire or cable 472 available in a variety of gauges with these characteristics. Section A in FIG. 39 comprises multiple strands of copper or other conductor wire which can also be individually coated or insulated to avoid conduction between the strands (similar to Litz wire) to avoid skin effects. Section B is an overcoat or layer of ferrite or other magnetic material. Section C is an optional outer coating or insulation. The ferrite layer or coating can be achieved by dipping into a slurry, sputtering, e-beam, etc. as appropriate.

Similarly, a magnetic or ferrite layer made of material with low saturation magnetic field values can be used above the transmitter coil (e.g., as a switching layer in MA or MC with or without flux guide geometries) while a material with higher saturation magnetic field value can be used below the transmitter coil and/or above the receiver coil for shielding purposes. For example, Nickel, cobalt, Mn, Zn, Fe, etc. or alloys of such material (see FIG. 15 or 17) with low saturation magnetic field values can be used as the top layer of the charger/transmitter while Sheet Steel or FineMET® or other shield material with high saturation magnetic field values would be used for shielding. For either material, care should be taken to use material that reduces or eliminates eddy currents through geometry or doping of the material to provide high resistivity. By using a low saturation magnetic field material, a smaller and/or weaker switching permanent magnet and/or electromagnet or resonant induced magnetic field can be used for switching the switchable layer. Thus, the shields would not be saturated by the magnet used for switching and would remain effective in shielding unwanted stray magnetic fields from affecting nearby devices, materials, or living tissue. In such a case, the total system would be completely shielded and safe. Power would at the same time transfer efficiently between the transmitter and receiver from the created magnetic aperture at one or more locations desired by user where receivers are placed.

In some circumstances, it may be desirable for a user to modify a receiver used for a fixed position or MR, MC, or MA system to function with a system with flux guides. As shown in FIGS. 30-37, this may require extending the magnetic shield layer to cover an area larger than behind the receiver coil in one or multiple dimensions.

Figure 40:
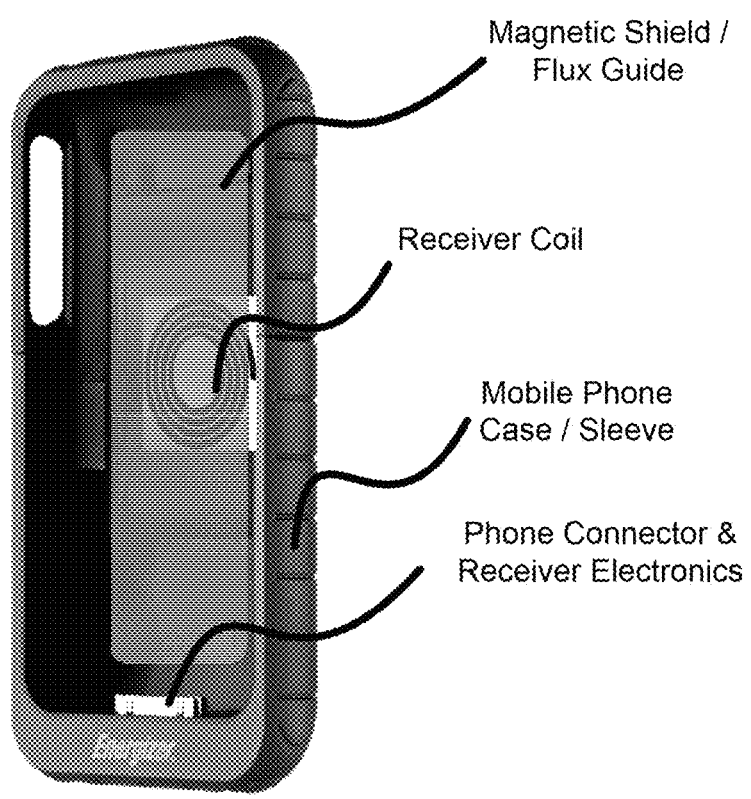
FIG. 40 illustrates a device including a shield/flux guide, in accordance with an embodiment.

In accordance with an embodiment 480 shown in FIG. 40, this shield/flux guide layer can be a thin solid or flexible ferrite or other magnetic layer that can be attached to the receiver or a case, battery door, phone case/sleeve, battery, dongle or mobile or other device by the manufacturer or by the user to extend this flux guide path. This attachment can be done during manufacture, or as an after-market or option by the consumer. In this manner, the device, battery, case/sleeve or part intended to be powered can be used with the flux guide position independent system described here. At the same time, the charging of the device on the original intended charger would not be affected and can be accomplished. An example a phone case/sleeve receiver can be designed to be charged by a fixed position or Wireless Power Consortium (WPC, an interoperability standard for tightly-coupled chargers and receivers) charger. By attaching a thin flexible or solid ferrite layer to the inside of the case or battery door behind the receiver coil a flux guide layer can be created allowing the device to be charged in a position independent manner on an appropriate system such as those shown in FIGS. 30-37 with flux guiding providing more utility and ease of use. This embodiment can be demonstrated experimentally with a WPC iPhone sleeve receiver.

Adding a thin (0.5 mm thick) layer of ferrite material extending the length of the sleeve to the inside part of the sleeve (between the sleeve and the phone), the WPC receiver case/sleeve can be used on the flux guide system or the MC Flux guide charger described above. The case/sleeve can of course function with its intended WPC chargers as well. Addition of the flux guide layer can be accomplished by the user or by the manufacturer and can provide this added functionality of spatial and coil to coil gap separation, without loss of original functionality or added bulk.

In the above descriptions many geometries and systems have been described. In accordance with various embodiments, one or several of the geometries or systems can be used in combination in a charger and/or receivers, to provide the desired performance and benefits. The above description and embodiments are not intended to be exhaustive, and are instead intended to only show some examples of the rich and varied products and technologies that can be envisioned and realized by various embodiments of the invention. It will be evident to persons skilled in the art that these and other embodiments can be combined to produce combinations of above techniques, to provide useful effects and products.

Some aspects of the present invention can be conveniently implemented using a conventional general purpose or a specialized digital computer, microprocessor, or electronic circuitry programmed according to the teachings of the present disclosure. Appropriate software coding can readily be prepared by skilled programmers and circuit designers based on the teachings of the present disclosure, as will be apparent to those skilled in the art.

In some embodiments, the present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for wireless charging comprising:
   a charger comprising:
      a charger coil comprising copper material, having a substantially planar surface;
      a thin magnetic planar layer located under the charger coil; and
      a charger drive circuit including resonant capacitors to supply an alternating current to the charger coil at an operating frequency;
   a receiver coupled to a mobile device to provide power to charge a battery in the mobile device, wherein the receiver comprises a receiver coil coupled to one or more resonant capacitors, a rectifier circuit, and smoothing capacitors, wherein the receiver is configured to operate at the operating frequency;
   wherein the receiver coil is a solenoid comprising a ferrite core with a relative magnetic permeability exceeding 1 and with copper Litz wire wrapped around the ferrite core along a winding axis that is located at a center of the ferrite core and that is substantially parallel to the planar surface to form a wound wire section, wherein the ferrite core extends beyond the wound wire section in the direction of the winding axis and terminates in a first end and a second end with a distance between the first end and the second end defining the length of the solenoid, and wherein the first end and the second end each have a smaller dimension in either axis of the end that is smaller than the length of the solenoid; and
   wherein the charger coil is patterned in a substantially spiral shape defining a charger coil area that is larger than an area of the first end and an area of the second end; and
   wherein when the charger coil is driven by the charger drive circuit with the alternating current, an inductive magnetic field in a direction substantially perpendicular to the planar surface, at the planar surface at a center of the charger coil area is generated; and
   wherein when the receiver coil is placed in a charging position relative to the planar surface, magnetic flux from the charger coil is guided through the ferrite core of the receiver coil and returns to close a magnetic loop through the thin magnetic planar layer to transfer power to the receiver to charge the battery; and
   wherein the system of the charger and the receiver is configured such that, in the charging position, a system quality factor is sufficiently high to guide the magnetic flux from the charger coil to the receiver coil when the winding axis of the solenoid is located at an operating distance from more than 3 mm to 2 cm from the planar surface.

2. The system of claim 1, whereby the charger coil is manufactured from a flexible printed circuit board.

3. The system of claim 1, wherein the charger is incorporated into a mobile electronic device that includes an internal rechargeable battery and may be operated by the internal rechargeable battery for a period of time.

4. The system of claim 3, wherein the mobile electronic device incorporating the charger is also configured to be charged or powered wirelessly.

5. The system of claim 3, wherein the mobile electronic device incorporating the charger further includes one or more additional wireless chargers or coils to charge additional devices.

6. The system of claim 3, wherein the mobile electronic device incorporating the charger is also configured to be powered or charged through a wired DC power and can simultaneously wirelessly charge or power one or more other devices.

7. The system of claim 3, wherein the mobile device being charged or powered also includes Bluetooth communication and communicates with the mobile electronic device incorporating the charger.

8. The system of claim 1, whereby the charger drive circuit operates in the Zero Voltage Switching or Zero Current Switching mode.

9. The system of claim 1, whereby the charger includes a microcontroller and detects the presence of the receiver through a periodic ping process.

10. The system of claim 1, whereby the receiver and the charger include communication and control electronics and communicate to establish or continue the charging process.

11. The system of claim 10, whereby the communication is through the charger and receiver coils.

12. The system of claim 11, whereby the communication between the receiver and charger is uni-directional.

13. The system of claim 11, whereby the communication between the receiver and charger is bi-directional.

14. The system of claim 1, whereby the magnetic field from the system is guided and contained so that the residual electromagnetic emissions near the system is within the safe compliance values.

15. The system of claim 1, whereby the mobile device being charged or powered is a remote controller.

16. The system of claim 1, whereby the mobile device being charged or powered is a mouse or pointing device.

17. The system of claim 1, wherein:
the receiver coil and the resonant capacitors form a resonant circuit when the receiver coil is placed in the charging position,
the resonant circuit has a single resonant frequency, and
the system is operated with the operating frequency equal to the single resonant frequency for wireless power transfer to charge the battery in the mobile device.

18. A wireless charging receiver, comprising:
a receiver configured to receive wireless power transfer from a charger having a charger coil, a substantially planar surface, and a thin magnetic planar layer, wherein the receiver is coupled to a mobile device to provide power to charge a battery in the mobile device, wherein the receiver comprises a receiver coil coupled to one or more resonant capacitors, a rectifier circuit, and smoothing capacitors, wherein the receiver is configured to operate at an operating frequency;
wherein the receiver coil is a solenoid comprising a ferrite core with a relative magnetic permeability exceeding 1 and with copper Litz wire wrapped around the ferrite core along a winding axis that is located at a center of the ferrite core and that is substantially parallel to the planar surface to form a wound wire section, wherein the ferrite core extends beyond the wound wire section in the direction of the winding axis and terminates in a first end and a second end with a distance between the first end and the second end defining the length of the solenoid, and wherein the first end and the second end each have a smaller dimension in either axis of the end that is smaller than the length of the solenoid;
wherein when the receiver coil is placed in a charging position relative to the planar surface, magnetic flux from the charger coil is guided through the ferrite core of the receiver coil and returns to close a magnetic loop through the thin magnetic planar layer to transfer power to the receiver to charge the battery; and
wherein the receiver is configured such that, in the charging position, a system quality factor of the receiver and the charger is sufficiently high to guide the magnetic flux to the receiver coil from the charger coil when the winding axis of the solenoid is located at an operating distance from more than 3 mm to 2 cm from the planar surface.

19. The wireless charging receiver of claim 18, wherein:
the receiver coil and the resonant capacitors form a resonant circuit when the receiver coil is placed in the charging position,
the resonant circuit has a single resonant frequency, and
the receiver is operated with the operating frequency equal to the single resonant frequency for wireless power transfer to charge the battery in the mobile device.

20. A wireless charger comprising:
a charger coil comprising copper material, having a substantially planar surface;
a thin magnetic planar layer located under the charger coil; and
a charger drive circuit including resonant capacitors to supply an alternating current to the charger coil at an operating frequency;
wherein the charger coil is patterned in a substantially spiral shape defining a charger coil area; and
wherein when the charger coil is driven by the charger drive circuit with the alternating current, an inductive magnetic field in a direction substantially perpendicular to the planar surface, at the planar surface at a center of the charger coil area is generated; and
wherein when a receiver that has a receiver coil comprising a solenoid with a ferrite core and is coupled to a mobile device is placed in a charging position relative to the planar surface, magnetic flux from the charger coil is guided through the ferrite core of the receiver coil and returns to close a magnetic loop through the thin magnetic planar layer to transfer power to the receiver to charge a battery in the mobile device; and
wherein the charger is configured such that, in the charging position, a system quality factor of the charger and the receiver is sufficiently high to guide the magnetic flux from the charger coil to the receiver coil when a winding axis that is located at a center of the ferrite core and that is substantially parallel to the planar surface is located at an operating distance from more than 3 mm to 2 cm from the planar surface.

* * * * *